United States Patent
Gallop et al.

(10) Patent No.: US 12,134,049 B2
(45) Date of Patent: Nov. 5, 2024

(54) MECHANICAL SEPARATION DEVICE

(71) Applicant: ICM, Inc., Colwich, KS (US)

(72) Inventors: Charles C. Gallop, Gower, MO (US);
Alex Dexter Wayman, Goddard, KS (US)

(73) Assignee: ICM, Inc., Colwich, KS (US)

( * ) Notice: Subject to any disclaimer, the term of this patent is extended or adjusted under 35 U.S.C. 154(b) by 1211 days.

(21) Appl. No.: 16/434,659

(22) Filed: Jun. 7, 2019

(65) Prior Publication Data

US 2019/0374883 A1 Dec. 12, 2019

Related U.S. Application Data

(60) Provisional application No. 62/682,966, filed on Jun. 10, 2018.

(51) Int. Cl.
*B01D 29/64* (2006.01)
*B01D 29/01* (2006.01)
*B01D 29/23* (2006.01)

(52) U.S. Cl.
CPC ....... *B01D 29/6476* (2013.01); *B01D 29/014* (2013.01); *B01D 29/23* (2013.01); *B01D 2201/18* (2013.01); *B01D 2221/06* (2013.01)

(58) Field of Classification Search
CPC .... B01D 29/23; B01D 29/90; B01D 29/6476; B01D 29/908; B01D 29/118; B01D 35/28; B07B 1/20; B30B 9/12; B30B 9/121
See application file for complete search history.

(56) References Cited

U.S. PATENT DOCUMENTS

| 113,780 A | 4/1871 | Lawton |
| 2,841,287 A | 7/1958 | Halbach |

(Continued)

FOREIGN PATENT DOCUMENTS

| AR | 092114 A1 | 3/2015 |
| AR | 115517 | 1/2021 |

(Continued)

OTHER PUBLICATIONS

"U.S. Appl. No. 15/796,446, Response filed Nov. 9, 2020 to Final Office Action mailed Jun. 8, 2020", 9 pgs.

(Continued)

*Primary Examiner* — Jonathan M Peo
(74) *Attorney, Agent, or Firm* — Schwegman Lundberg & Woessner, P.A.

(57) ABSTRACT

A rotary tool for a mechanical separator, the tool can optionally comprise: a center shaft having a longitudinal axis; a plurality of longitudinal paddles coupled to the shaft, at least one paddle of the plurality of paddles having an inner edge and aligned radially relative to the longitudinal axis, wherein the at least one paddle has an elongate extent along the longitudinal axis with opposing lateral sides along the elongate extent; and a flange having a triangular shape in a radial cross-section, the flange affixed to the inner edge of the at least one paddle and having an apex radially inward of the at least one paddle. Other examples of the application include the rotary tool having a plurality of tools and the mechanical separator having the capability of being raised or lowered to alter a residence time of slurry within the mechanical separator.

16 Claims, 11 Drawing Sheets

(56) References Cited

U.S. PATENT DOCUMENTS

| | | | |
|---|---|---|---|
| 2,861,326 | A | 11/1958 | Bergstrom |
| 2,973,866 | A | 3/1961 | Genter et al. |
| 3,695,173 | A * | 10/1972 | Cox .......................... B30B 9/12 |
| | | | 210/414 |
| 3,725,262 | A | 4/1973 | Mattice et al. |
| 4,080,607 | A | 3/1978 | Van et al. |
| 4,202,777 | A | 5/1980 | Schall |
| 4,276,159 | A | 6/1981 | Lehman |
| 4,911,828 | A | 3/1990 | Musselmann et al. |
| 5,950,840 | A | 9/1999 | Thoma |
| 6,113,780 | A | 9/2000 | Buzanoski |
| 6,565,698 | B1 | 5/2003 | Adams et al. |
| 9,376,504 | B2 | 6/2016 | Dieker et al. |
| 9,718,006 | B2 | 8/2017 | Lee et al. |
| 11,103,811 | B2 | 8/2021 | Gallop |
| 11,969,673 | B2 | 4/2024 | Gallop |
| 2002/0096460 | A1 * | 7/2002 | Ruescher ............. B01D 29/828 |
| | | | 210/154 |
| 2005/0006284 | A1 | 1/2005 | Zeller |
| 2006/0008865 | A1 | 1/2006 | Cote et al. |
| 2008/0217002 | A1 | 9/2008 | Simonds et al. |
| 2008/0308478 | A1 | 12/2008 | Stern et al. |
| 2009/0000994 | A1 | 1/2009 | Kato et al. |
| 2010/0012596 | A1 | 1/2010 | Lee |
| 2010/0043649 | A1 * | 2/2010 | Maupin ..................... B07B 1/55 |
| | | | 99/348 |
| 2011/0111456 | A1 | 5/2011 | Medoff |
| 2012/0181237 | A1 | 7/2012 | Winkler et al. |
| 2013/0048551 | A1 | 2/2013 | Maxson et al. |
| 2014/0127772 | A1 | 5/2014 | Kohl |
| 2015/0152371 | A1 | 6/2015 | Gallop et al. |
| 2015/0231535 | A1 * | 8/2015 | Lee .................... B01D 29/6476 |
| | | | 210/457 |
| 2015/0343349 | A1 | 12/2015 | Wells et al. |
| 2016/0221040 | A1 * | 8/2016 | Oude Grotebevelsborg ............... |
| | | | B07B 4/08 |
| 2016/0256803 | A1 | 9/2016 | Thrasher et al. |
| 2017/0145377 | A1 | 5/2017 | Dieker et al. |
| 2017/0151520 | A1 | 6/2017 | Tate et al. |
| 2017/0256803 | A1 | 9/2017 | Evans et al. |
| 2017/0368555 | A1 * | 12/2017 | Franko ................... B01D 29/94 |
| 2018/0126302 | A1 | 5/2018 | Gallop |
| 2020/0368649 | A1 * | 11/2020 | Moir .................... B01D 29/356 |

FOREIGN PATENT DOCUMENTS

| | | |
|---|---|---|
| BR | 102019011975 | 12/2019 |
| CA | 3014750 | 9/2016 |
| CA | 2984208 A1 | 5/2018 |
| CA | 2984208 C | 3/2020 |
| CN | 104903012 | 9/2015 |
| CN | 106606954 A | 5/2017 |
| CN | 107261940 A | 10/2017 |
| CN | 107530659 A | 1/2018 |
| CN | 107635635 A | 1/2018 |
| CN | 110575701 | 12/2019 |
| FR | 1568117 A | 5/1969 |
| WO | 2016137641 | 9/2016 |

OTHER PUBLICATIONS

"Argentina Application Serial No. P170103057, Office Action mailed Sep. 23, 2020", with English translation, 7 pages.
"U.S. Appl. No. 15/796,446, Non Final Office Action mailed Nov. 27, 2020", 8 pgs.
"U.S. Appl. No. 15/796,446, Response filed Mar. 1, 2021 to Non Final Office Action mailed Nov. 27, 2020", 12 pgs.
"U.S. Appl. No. 15/796,446, Notice of Allowance mailed Apr. 2, 2021", 7 pgs.
"Argentina Application Serial No. P170103057, Response filed May 5, 2021 to Office Action mailed Sep. 23, 2020", with English claims, 64 pages.
"Argentina Application Serial No. P170103057, Office Action mailed Jun. 22, 2021", with machine English translation, 14 pages.
"U.S. Appl. No. 15/796,446, PTO Response to Rule 312 Communication mailed Aug. 6, 2021", 2 pgs.
"Brazilian Application Serial No. 1020170236676, Office Action mailed Aug. 19, 2021", with machine English translation, 13 pages.
"U.S. Appl. No. 17/364,873, Preliminary Amendment filed Sep. 13, 2021", 7 pages.
"U.S. Appl. No. 15/796,446, Non Final Office Action mailed Oct. 31, 2019", 10 pgs.
"U.S. Appl. No. 15/796,446, Response filed Mar. 31, 2020 to Non Final Office Action mailed Oct. 31, 2019", 14 pgs.
"U.S. Appl. No. 15/796,446, Final Office Action mailed Jun. 8, 2020", 8 pgs.
Argentina Application Serial No. P190101593, Office Action mailed Aug. 2, 2022, w/ English Translation, 5 pgs.
Chinese Application Serial No. 201910497811.X, Office Action mailed Jan. 28, 2022, with English translation, 12 pages.
Chinese Application Serial No. 201910497811.X, Office Action mailed Jun. 24, 2022, W/English Translation, 16 pgs.
Chinese Application Serial No. 201910497811.X, Response filed May 18, 2022 to Office Action mailed Jan. 28, 2022, w/English Claims, 17 pgs.
Chinese Application Serial No. 201910497811.X, Response filed Sep. 6, 2022 to Office Action mailed Jun. 24, 2022, w/English Claims, 18 pgs.
Paraguay Application Serial No. 1783790, Office Action mailed Apr. 18, 2022, W/O English Translation, 3 pgs.
Paraguay Application Serial No. 1783790, Response filed Jul. 11, 2022 to Office Action mailed Apr. 18, 2022, w/ English claims, 7 pgs.
U.S. Appl. No. 17/364,873, Examiner Interview Summary mailed Dec. 13, 2023, 3 pgs.
U.S. Appl. No. 17/364,873, Non Final Office Action mailed Sep. 14, 2023, 21 pgs.
U.S. Appl. No. 17/364,873, Notice of Allowance mailed Jan. 12, 2024, 11 pgs.
U.S. Appl. No. 17/364,873, Response filed Dec. 13, 2023 to Non Final Office Action mailed Sep. 14, 2023, 15 pgs.
Argentina Application Serial No. P190101593, Office Action mailed Dec. 16, 2022, w/ English Machine Translation, 18 pgs.
Argentina Application Serial No. P190101593, Response filed Feb. 14, 2023 Office Action mailed Dec. 16, 2022, w/ English claims, 87 pgs.
Argentina Application Serial No. P190101593, Response filed Oct. 17, 2022 to Office Action mailed Aug. 2, 2022, w/ English Claims, 99 pgs.
Brazilian Application Serial No. BR102019011975-6, Office Action mailed Dec. 5, 2022, w/ English Translation, 6 pgs.
Brazilian Application Serial No. BR102019011975-6, Response filed Mar. 10, 2023 to Office Action mailed Dec. 5, 2022, w/ English Claims, 86 pgs.
Canadian Application Serial No. 2,984,208, Office Action mailed Jan. 28, 2019, 5 pgs.
Canadian Application Serial No. 2,984,208, Office Action mailed Jul. 8, 2019, 4 pgs.
Canadian Application Serial No. 2,984,208, Office Action mailed Aug. 6, 2018, 4 pgs.
Canadian Application Serial No. 2,984,208, Response filed Apr. 26, 2019 to Office Action mailed Jan. 28, 2019, 9 pgs.
Canadian Application Serial No. 2,984,208, Response filed Oct. 8, 2019 to Office Action mailed Jul. 8, 2019, 6 pgs.
Canadian Application Serial No. 2,984,208, Response filed Nov. 5, 2018 to Office Action mailed Aug. 6, 2018, 9 pgs.
Chinese Application Serial No. 201910497811.X, Office Action mailed Nov. 22, 2022, w/ English Translation, 15 pgs.
Paraguay Application Serial No. 1945399, Examination Report mailed Oct. 12, 2023, w/o English translation, 3 pgs.
Paraguay Application Serial No. 1945399, Response filed Jan. 15, 2024 to Examination Report mailed Oct. 12, 2023, w/ English claims, 13 pgs.

* cited by examiner

MECHANICAL SEPARATION DEVICE

CROSS REFERENCE TO RELATED APPLICATION

This application claims the benefit of priority to U.S. Provisional Application No. 62/682,966, entitled "Mechanical Separation Device," filed on Jun. 10, 2018, the content of which is hereby incorporated by reference in its entirety

TECHNICAL FIELD

The subject matter of this disclosure relates to a mechanical separation device that is used to separate components in a process stream. In particular, the subject matter is directed to design improvements for the mechanical separation device to more efficiently separate solids from a process stream in a more efficient manner, to improve life of the equipment based on the design improvements, and to increase overall efficiency of a plant.

BACKGROUND

A wide range of industrial applications require materials to be separated into several components through, for example, some type of filtration process utilizing a liquid medium. Once filtered, the separated component, and/or the remainder of solid material and liquid medium, may be further processed so as to result in one or more desired products. By way of example, various methods of producing alcohol from grain may require fibrous component of the grain be separated from starch and/or other components of the grain.

There are two known corn processes to produce ethanol: corn wet milling and dry grind milling. Corn wet milling, for example, separates the fiber from the starch in corn and subsequently uses the starch to produce ethanol, which may be used for fuel for automobiles or other motor vehicles. Dry grind milling, for example, also separates the fiber or insoluble solids (also referred to as "wet cake") from the liquid in a process stream, such as "thin stillage" from the residuals, i.e., "whole stillage", produced from distillation. The fiber can be subsequently used to produce distillers grains for animal feed, such as feed for cattle, pigs, or chickens.

In corn milling processes, the corn feedstock is mixed with water to form a slurry having a relatively high percentage of water (e.g., 60% or higher). The process may separate the fiber from the slurry, which in addition to the water, contains, for example, starch and other components of the corn, and the slurry is further processed to produce ethanol. Conventional devices used for separation may include pressure screen devices, gravity screen devices, centrifuges, and other separation type devices.

Pressure screen devices separate larger particles out of a process stream under "pressure." For instance, the pressure screen devices may use a rotating screw to direct the slurry to flow through a static screen under relatively low fluid pressure. The screen includes openings sufficiently sized to permit water, starch, and any other components smaller than the openings to flow through the screen while preventing the fiber from flowing through, thus essentially filtering the fiber from the slurry. However, pressure screen devices have efficiency problems by limiting flow rates and by requiring a thick influent (entering stream) to be efficient. Liquids have a high solids content.

Gravity screen devices direct a process stream through a static screen under gravity action. Separation efficiency occurs based on a screen opening size to prevent large size particles from passing through the screen opening. However, gravity screen devices have efficiency problems in that they require long residence times on the screen to maximize separation efficiency. Gravity screen devices also require the components to have a difference in specific gravity. Solids have a high moisture content.

A centrifuge may be used to separate and recover various components. However, a centrifuge may not fully separate components because separation is based on density differential, which may not be sufficient to adequately separate solids from liquids in some process streams. Centrifuges can also be expensive to purchase and operate, can require frequent maintenance and repair, and can require a higher skill set to operate and to maintain. Also, solids output from centrifuges can have high moisture content, which can drive up operating costs to transport and to dry the solids downstream. In addition, centrifuges can create emissions from plants that use them.

Other separation devices include wedge-wire screens or filters to separate the components. However, components can tend to become clogged or plugged in wedge-wire screens. Furthermore, wedge-wire screens can have premature and/or abrasive wear from the solids being filtered, and are known to be relatively easy to break. These problems with wedge-wire screens can create down time at plants requiring a change to the wedge wire screens, as well as increased operating costs. Furthermore, wedge-wire screens often fail to remove flat-shaped particles very well and are expensive.

Accordingly, there is a need for improved designs on mechanical separation devices to improve separation efficiencies, to improve throughput, to reduce capital costs, and to reduce shutdown time at plants.

SUMMARY

This disclosure is directed to an improved mechanical separation device for separating solids from liquids in a process stream. The improved mechanical separation device of the present disclosure increases separation efficiency and or reduces the energy needed for processing, which in turn reduces greenhouse gas emissions or carbon emissions, and reduces operating costs and/or reduces capital costs.

In an embodiment, a mechanical separation device for the separation of solids from a liquid medium is provided. The mechanical separation device includes a housing with a feed inlet at a feed end of the housing, the feed inlet configured to receive a slurry comprising solids within a liquid medium, a cylindrical screen positioned within the housing to separate at least a portion of the liquid medium from the solids, the cylindrical screen comprising a sheet of material formed into at least a portion of a cylinder having a central axis, the sheet of material comprising an inner screen surface that defines an interior space within the cylindrical screen and an outer screen surface with a plurality of openings formed through the sheet of material for fluid communication between the interior space and the outer screen surface. The feed inlet is configured to feed the slurry into the interior space within the screen. A rotary conveyor is positioned within the interior space to convey the solids and the liquid medium along an axial length of the interior space toward a discharge outlet at a discharge end of the housing. The rotary conveyor comprises a shaft configured to rotate about a central axis, a plurality of paddles each extending radially from the shaft from a proximal edge coupled to the shaft to a distal edge, and a plurality of flingers coupled to the distal edge of each of the plurality of paddles, each flinger having a first leading edge and a second leading edge, the first leading edge disposed on a first side of a paddle and the second leading edge disposed on a second, opposing, side of the paddle and aligned in a chevron configuration, the first leading edge and the second leading edge configured to rotate with the shaft and clear an interior surface of a screen, and the flingers configured to propel material in a direction from the first end of the rotor to a second end of the rotor, and wherein each flinger comprises an inner side and an opposing outer side, wherein the inner side of each flinger is coupled to the distal edge of the paddle and the outer side comprises a tapered outer surface such that the flinger is thinner at the first leading edge and the second leading edge than along a center axis of the flinger.

In some examples, the flingers on adjacent paddles are staggered so that the mechanical separation device provide for improved separation of liquid medium from the solids material. The staggered orientation of the flingers act to enhance, and in some examples maximize, liquid/solid separation and axial conveyance of solids material toward the discharge outlet.

In some examples, the rotary conveyor is configured as a bi-directional conveyor that will axially convey the solids material toward the discharge outlet whether the conveyor is rotated in either direction. In an example, each flinger includes a first leading edge facing in a first lateral direction on a first side of the paddle and a second leading edge facing in a second lateral direction on a second side of the paddle opposite from the first lateral direction and first side. The first leading edge conveys material axially forward when the conveyor is rotated in a first rotation direction and the second leading edge convey material axially forward when the conveyor is rotated in a second rotation direction that is opposite the first rotation direction.

In some examples, a mechanical separation device includes a raising mechanism that elevates he discharge end to a specified angulation relative to horizontal. Elevating of the discharge end enhances separation of liquid medium from solids material by lengthening the residence time in the housing. In some examples, elevating the discharge end also provides for at least partial gravity or density-based separation of liquid medium from solids material, rather than only relying on particle size and the size of the screen openings in the mechanical separation device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other aspects and advantages of the claimed subject matter will be apparent from the following Detailed Description of the embodiments and the accompanying figures.

BRIEF DESCRIPTION OF THE DRAWINGS

The Detailed Description is set forth with reference to the accompanying figures. The use of the same reference numbers in different figures indicates similar or identical items. The features illustrated in the figures are not necessarily drawn to scale, and features of one embodiment may be employed with other embodiments as the skilled artisan would recognize, even if not explicitly stated herein. The accompanying drawings illustrate example embodiments of the subject matter and, with a detailed description of the embodiments given below, serve to explain the principles of the subject matter.

DETAILED DESCRIPTION

Figure 1:
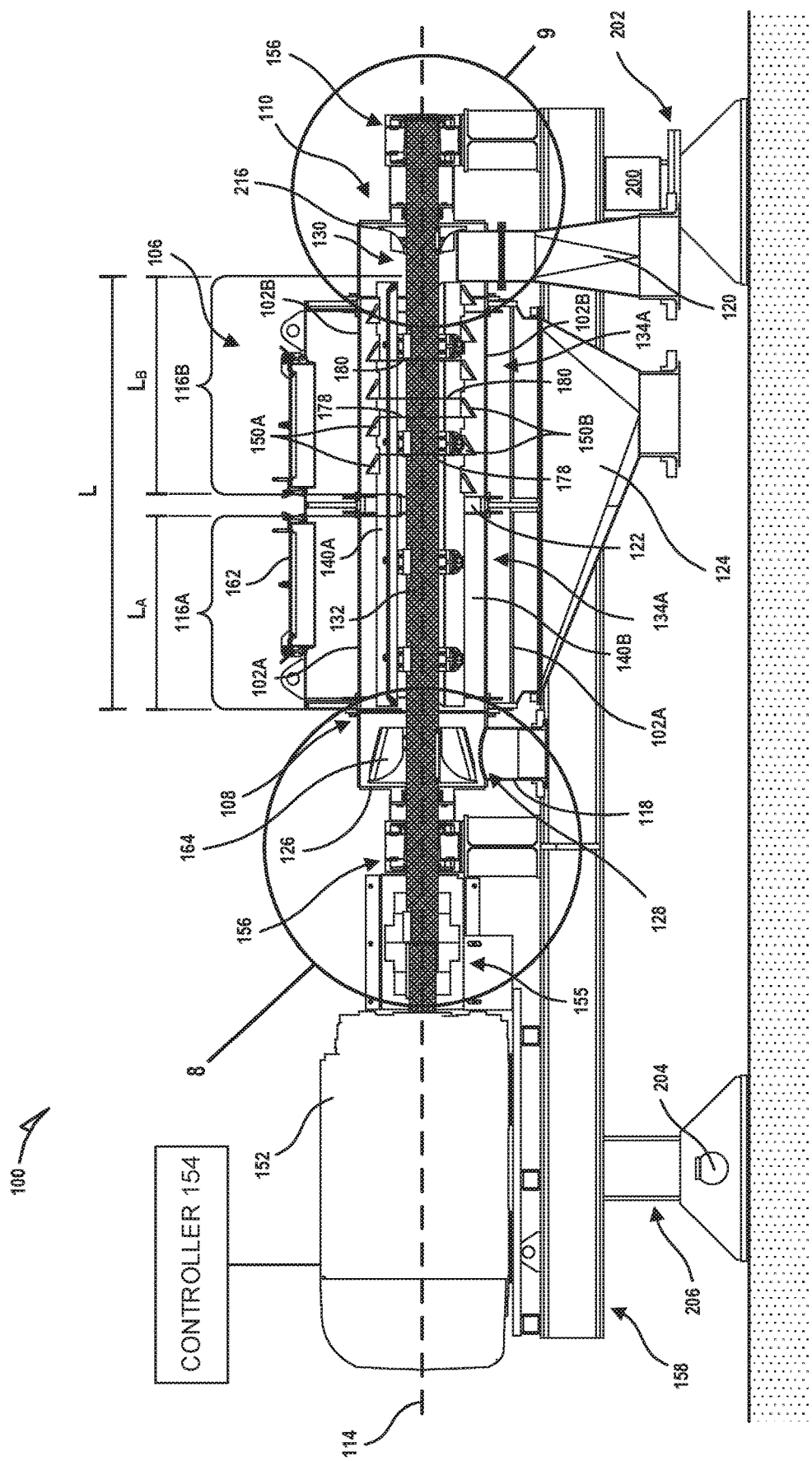
FIG. 1 is a cross-sectional side view of an example mechanical separation device.

The Detailed Description describes embodiments of the subject matter and the various features and advantageous details thereof are explained more fully with reference to non-limiting embodiments and examples that are illustrated in the accompanying figures and detailed in the following description. Descriptions of well-known components and processing techniques may be omitted so as to not unnecessarily obscure the embodiments of the subject matter. The examples used herein are intended merely to facilitate an understanding of ways in which the subject matter may be practiced and to further enable those of skill in the art to practice the embodiments of the subject matter. Accordingly, the examples, the embodiments, and the figures herein should not be construed as limiting the scope of the subject matter.

This disclosure describes examples of a mechanical separation device that can be used to separate components, such as solids from liquids, in a process stream obtained from a production facility. For instance, the production facility may include, but is not limited to, a facility that produces one or more of biofuel, alcohol (e.g., ethanol), animal feed, oil, biodiesel, pulp and paper, textiles, chemicals, and production facilities in other fields. In an example, the mechanical separation device separates solids from a process stream in an ethanol production facility upstream of fermentation, e.g., so that the solids can bypass fermentation. In another example, the mechanical separation device separates the solids from a process stream in an ethanol production facility downstream of fermentation, e.g., to provide for one or both of a drier solid product or a more pure liquid stream for further processing. The improved design aspects of the example mechanical separation device improve separation efficiencies, which will reduce operating costs as well as reduce energy usage for downstream processing in the production facility.

The majority of the fuel ethanol in the United States is produced from the corn wet milling process or the dry grind milling process. Any type and quality of grain can be used to produce ethanol, such that the feedstock for these processes can include, but is not limited to, corn known as "No. 2 Yellow Dent Corn." The "No. 2" refers to a quality of corn having certain characteristics as defined by the National Grain Inspection Association, as is known to those of skill in the art. "Yellow Dent" refers to a specific type of corn, which is also known to those of skill in the art. Sorghum grain is also utilized to a very small extent. For corn milling, the current industry average for ethanol yield for both dry grind milling and corn wet milling plants is approximately 10.2 liters (approximately 2.7 gallons) of ethanol produced per 25.4 kg (one (1) bushel) of No. 2 Yellow Dent Corn. Specific embodiments of the design improvements are used for illustration purposes in the wet milling process and the dry grind milling process, and should not be considered limiting for corn wet milling or dry grind milling or for any other field in which the improved mechanical separation device may be used. The design improvements may be implemented in production facilities in fields other than ethanol production, as discussed above.

Turning to FIG. 1, a cross-sectional side view of an example mechanical separation apparatus 100 (also referred to simply as "the apparatus") is shown. The example apparatus 100 comprises a self-contained device configured for separating a solids material from at least a portion of a liquid medium. In an example, the solids material that is separated by the apparatus 100 includes fiber from a corn wet milling or dry grind milling ethanol production process, and the liquid medium separated from the fiber solids can include a pre-fermentation starch solution or a post-fermentation beer or stillage. In examples where the apparatus 100 is used in a corn wet milling process, the apparatus 100 can perform one or more of the initial filtering of the slurry, pre-washing of the fiber to clean the fiber and to remove starch/gluten that is associated with the fiber, or washing/dewatering of the fiber. For a dry grind milling process, the apparatus 100 can perform one or more of: an initial filtering of the slurry; pre-washing of the fiber to clean the fiber, gluten, or fat; to remove starch that associated with the fiber; or washing/dewatering of the fiber, gluten, or fat.

Figure 2:
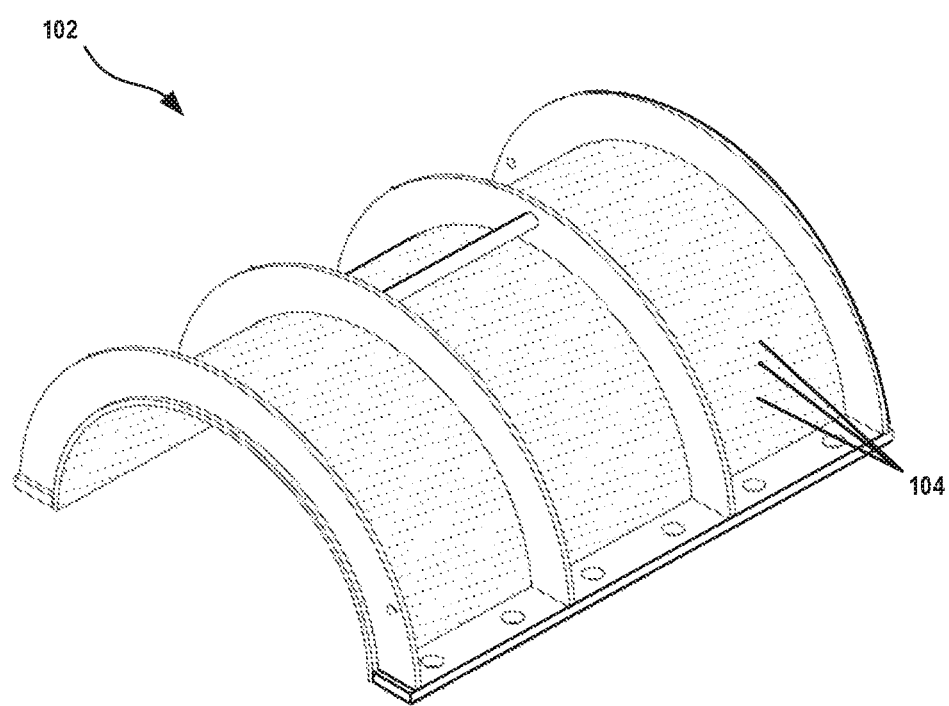
FIG. 2 is an isometric view of an example screen that can be used, for example, in the mechanical separation device of FIG. 1.

The apparatus 100 includes one or more stationary, cylindrical-shaped screens 102A, 102B (collectively referred to as "screen 102" or "screens 102"). FIG. 2 shows a non-limiting example embodiment of a screen 102 that can be used in the apparatus 100. As shown in FIG. 2, in an example, each screen 102 can include a plurality of openings 104 formed therein, for example as a set of openings 104 that are formed through a sheet of material that makes up the screen 102. The openings 104 permit the liquid medium, including any wash water and any starch and/or gluten and/or fine suspended particles (including yeast from fermentation) washed off the fiber, to pass through the screen 102 while preventing larger-sized solids material, such as fiber, from passing through. Further details of the example screen 102 shown in FIG. 2 are described below.

Returning to FIG. 1, the one or more screens 102 are disposed in an interior of an elongated housing 106, which includes a first end 108, also referred to as a feed end 108, and a second end 110, also referred to as an discharge end 110. The one or more screens 102 are situated about a central axis 114 of the apparatus 100 and extend substantially along the length (L) of the housing 106.

Although a single or a unitary elongated screen may be utilized, the apparatus 100 in FIG. 1 is shown with individual first and second screen sections 102A and 102B, which are situated adjacent one another along a length of the housing 106 to generally correspond respectively with first and second zones 116A and 116B of the housing 106. The first screen section 102A is located proximate to a feed inlet 118 located at or proximate to the feed end 108 of the housing 106 adjacent the first zone 116A to receive the incoming process stream to be separated, e.g., a slurry that includes solids material and a liquid medium. In an example, the first screen section 102A extends partly along the length (L) of the housing 106 to about a midway point thereof. The second screen section 102B is situated axially adjacent to the first screen section 102A at about the midway point and extends partly along the remainder of the length (L) of the housing 106 to proximate a solids discharge chute 120, which is situated at or proximate to the discharge end 110 of the housing 106 adjacent the second zone 116B.

The plurality of openings 104 in the screen 102 may vary in size depending on the specific application and on the type of material being filtered. For example, for filtration of fiber from a corn milling process, it is contemplated that the openings in the first and second screen sections 102A, 102B may be sized from about 10 microns (0.01 mm) to about 2000 microns (2 mm). In another example, the openings 104 may be from about 800 microns to about 1400 microns (about 0.8 mm to about 1.4 mm). The openings 104 in the first screen section 102A may be the same size as the openings in second screen section 102B, larger than the openings in the second screen section 102B, or smaller than the openings in the second screen section 102B. The size of the openings 104 will be determined based on size and shape of the desired material to be separated. The screens 102A, 102B can be provided with smaller openings due to the overall length. In certain applications, increasing the length of the screens 102A, 102B allows for smaller openings, which provides for a more desirable dewatering of the materials through the apparatus 100. Smaller openings also can limit the amount of solids passing through the screens 102A, 102B while still providing for desirable recovery of liquid medium and output of dry material, e.g., fiber.

In yet other embodiments, the screen 102 may have different sizes for the plurality of openings 104. For example, the plurality of openings may range from smaller to larger sizes, such as sizes from about 1000 microns in a FIRST section, about 1100 microns in a SECOND section, and about 1200 microns in a THIRD section. In another embodiment, the plurality of openings may range from larger to smaller sizes, such as sizes from about 1200 microns in a FIRST section, about 1100 microns in a SECOND section, and about 1000 microns in a THIRD section. In other embodiments, two sections may have similar plurality of opening sizes, while another section has a smaller or a larger plurality of opening size than the other two sections.

The lengths $L_A$ and $L_B$ of the first and second screen sections 102A and 102B, respectively, may vary but, due to the overall length, a large volume of liquid medium and solids material can be processed while still producing a desirably dry material. For example, the first or second screen section 102A, 102B may extend less than or more than about the midway point of the apparatus 100. Also, while only two screen sections 102A, 102B are shown in the example apparatus 100 of FIG. 1, those of skill in the art will appreciate that only a single screen can be used, or that more than two screen sections may be utilized. In addition, while the diameter of the screens 102 is shown as being substantially constant along its length, the screen diameter may vary along at least one or more portions thereof. In one example, the apparatus 100 may have a screen length to screen diameter (L/D) ratio greater than 3. In another example, the L/D screen ratio is between approximately 3 and 10, and more preferably between 4 and 6. These values are exemplary and those of ordinary skill in the art will recognize other ratios suitable for a particular application.

The housing 106 generally surrounds the screens 102 and collects the liquid medium that passes through the plurality of openings 104 in the screens 102 (shown in FIG. 2). In an example, the housing 106 includes at least one interior partition 122 that compartmentalizes and separates the housing 106 into the first and second zones 116A, 116B. The first and second zones 116A, 116B can include a hopper 124 with a corresponding outlet for the removal of filtered liquid medium from the housing 106 and to direct the filtered liquid medium to a desired location. In the example of FIG. 1, the first and second zones 116A, 116B are positioned sequentially and axially adjacent to one another.

In an example, the first zone 116A generally defines an initial separation zone, while the second zone 116B generally defines another separation zone. In the example of FIG. 1, the solids discharge chute 120 is located at or proximate to the end of the second zone 116B. The solids discharge chute 120 allows the separated and de-watered solids material, such as separated and dewatered fiber, to be collected for further processing. Although two zones 116A, 116B are illustrated here, those of ordinary skill in the art will appreciate that the number of separation zones 116A and the number of dewatering zones 116B may be application specific, i.e., may vary in number as well as in length. For example, the first or second zone 116A, 116B may extend less than or more than about the midway point of the apparatus 100. The housing 106 may have any suitable shape. If more than two zones are desired, e.g., three zones, the housing 106 may simply be adapted to include an additional interior partition 122 to further compartmentalize the housing into a first zone 116A, a second zone 116B, and a third zone (not shown in FIG. 1), which can include a hopper 124 with a corresponding outlet for removing filtered liquid medium from the zones 116A, 116B and directing the filtered liquid medium to a desired location. In one example, the interior partition 122 is movable or adjustable, e.g., slidably adjustable, generally along the length (L) of the apparatus to vary or control the size of the zones 116A, 116B.

The feed inlet 118 is located at or proximate to the feed end 108 of the housing 106. In an example, the feed inlet 118 is adjacent to the first zone 116A and in fluid communication with an interior space of the first screen section 102A that corresponds with the first zone 116A of the housing 106. For example, the housing 106 or some other structure within the apparatus 100 can direct a feed flow of a process stream, e.g., a process stream that includes a liquid medium and a solids material, into the interior space of the first screen section 102A proximate to the central axis 114. In an example, the feed inlet 118 is configured to feed the liquid medium and the solids material, e.g., fiber, in a feed direction that is angled relative to the central axis 114 and the feed inlet 118 is also configured to change the direction of the liquid medium and the solids material to be separated from the angled feed direction to an axial direction that is general parallel to the central axis 114.

In some examples, the feed inlet 118 is configured so that the feed direction of the liquid medium and solids material is perpendicular or substantially perpendicular to the central axis 114. In some examples when the feed inlet 118 provides for a feed direction that is perpendicular or substantially perpendicular to the central axis 114, the feed inlet 118 introduces the liquid medium and solids material with a tangential or substantially tangential entry into the interior of the housing 106 so that the liquid medium and solids material enter the interior in a swirling fashion so that filtering of the solids material can be begin upon entry into the apparatus 100.

In an example, the feed inlet 118 is formed as part of a feed housing 126 that includes an inlet opening 128 through which the liquid medium and solids material, e.g., fiber, is fed into the interior of the housing 106. The inlet opening 128 can include hardware for connecting to piping or other conveyance structures through which the liquid medium and solids material can flow, for example when being fed to the apparatus 100 from another processing apparatus from another part of the process. In the example shown in FIG. 1, the inlet opening 128 is located on a bottom side of the feed housing 126 so that the liquid medium and solids material is fed generally upward into the feed housing 126. In an example, a connection between the feed housing 126 and the main housing 106 of the apparatus 100 is adjustable so that the orientation of the feed housing 126 relative to the main apparatus housing 106 can be changed to position the inlet opening 128 in locations other than on the bottom of the apparatus 100. For example, the feed housing 126 can be rotated about the central axis 114 relative to the main housing 106 so that the inlet opening 128 is on a top side of the apparatus 100 rather than on the bottom so that the liquid medium and solids material can be fed downward into the apparatus 100. In other examples, the connection between the feed housing 126 and the main housing 106 can be configured to allow the inlet opening 128 to positioned on a side of the feed housing 126 so that the liquid medium and solids material can be fed laterally into the apparatus 100. Examples that include a feed housing 126 that is positionable relative to the main housing 106 can give a system designer more flexibility to install the apparatus 100 because the feed housing 126 can be rotated relative to the main housing 106 and position the inlet opening 128 at a convenient position for existing or planned feed piping.

Figure 3A:
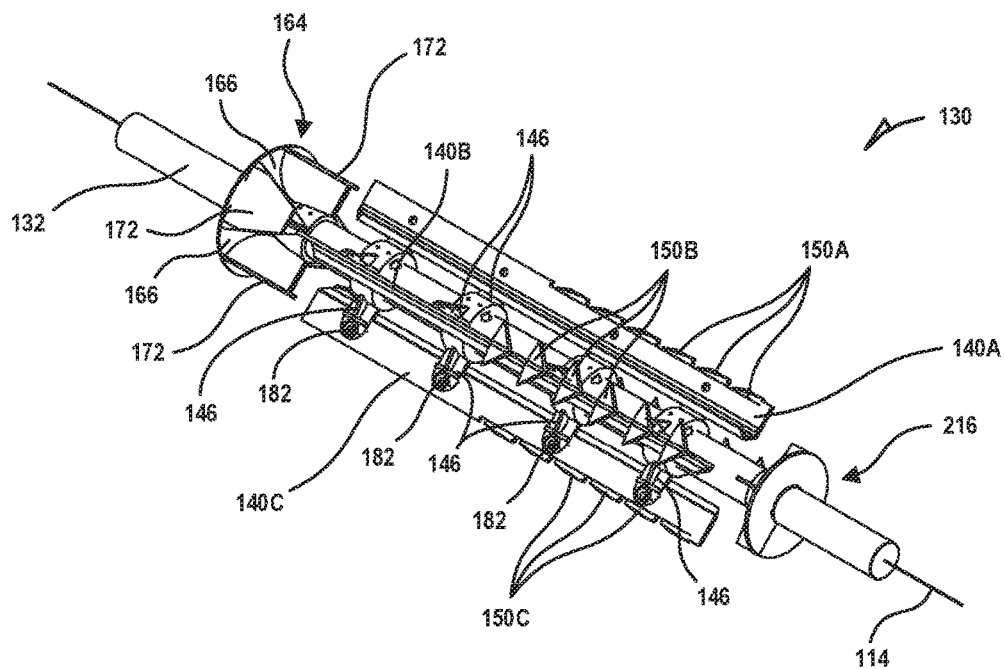
FIG. 3A is an isometric view of an example rotatable conveyor that can be used in the example mechanical separation device of FIG. 1.
Figure 3B:
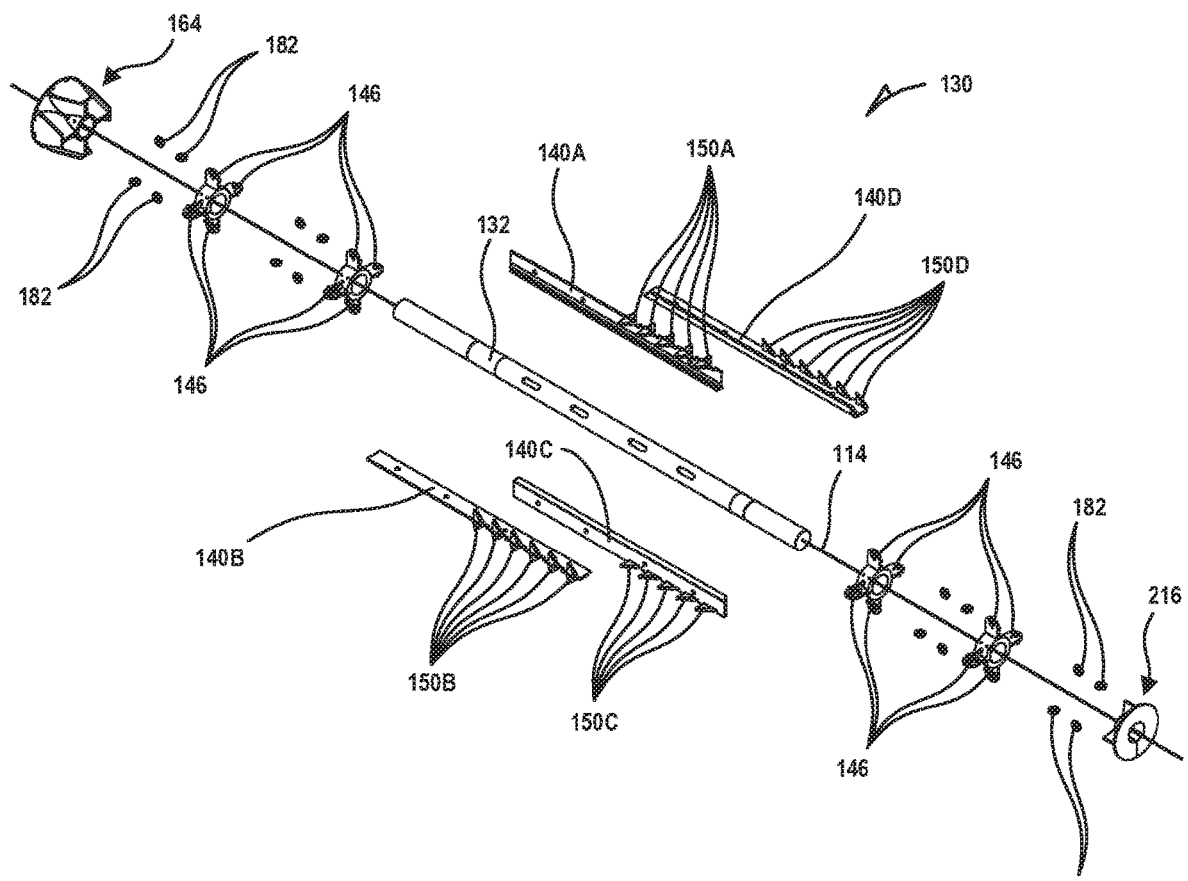
FIG. 3B is an exploded isometric view of the example rotatable conveyor of FIG. 3A.

In addition to the one or more screens 102, the mechanical separation apparatus 100 also includes a rotatable conveyor 130 (also referred to simply as "the conveyor 130") that is disposed or situated within the interior space of the screen 102. FIG. 3A shows an isometric view of the rotatable conveyor 130 in an assembled state, while FIG. 3B shows a more fully exploded isometric view of the rotatable conveyor 130, e.g., before the components of the conveyor 130 has been assembled. In an example, the conveyor 130 is positioned lengthwise within the interior space of the one or more screens 102 and is configured to move the material being processed (e.g., the liquid medium and the solids material) generally axially along the length (L) of the housing 106 from the feed inlet 118 towards the discharge chute 120. The conveyor 130 includes structures (described in more detail below) that are configured so that when the conveyor 130 rotates relative to the stationary screen 102, the conveyor 130 directs the liquid medium and solids material radially outward toward the one or more screens 102 to filter the solids material from the liquid medium. The conveyor also includes structures (described in more detail below) that can push the solids material axially along the length of the housing 106 within the interior space of the screens 102. In an example, the conveyor 130 rotates around the central axis 114.

The conveyor 130 includes a rotatable shaft 132 that extends along the length (L) of the apparatus 100 and is situated about the central axis 114. In an example, the shaft 132 defines a first conveyor section 134A that generally corresponds with the first zone 116A of the first screen section 102A and a second conveyor section 134B that generally corresponds with the second zone 116B of the second screen section 102B.

In an example, the conveyor 130 includes a plurality of paddles 140 that are coupled to the rotatable shaft 132 so that the paddles extend radially outward from an outer surface of the shaft 132. In an example, seen in FIGS. 4-7A each paddle 140 includes a proximal edge 142 that is coupled to the shaft 132 and a distal edge 144 that generally opposes and is radially spaced from the proximal edge 142. In an example, the paddles 140 are configured and positioned so that the distal edges 144 are in close proximity to an inner surface of the screen 102 so that the rotational force exerted on the liquid medium and solids material by the paddles 140 is maximized. In an example, shown in FIGS. 1, 3A, and 3B, each paddle 140 is coupled to the shaft 132 with one or more spaced apart support arms 146 that are coupled to the shaft 132 (best seen in FIG. 3A). The support arms 146 can be coupled to their corresponding paddle 140 with any reasonable fastening structure, including, but not limited to, nuts and bolts.

Figure 5:
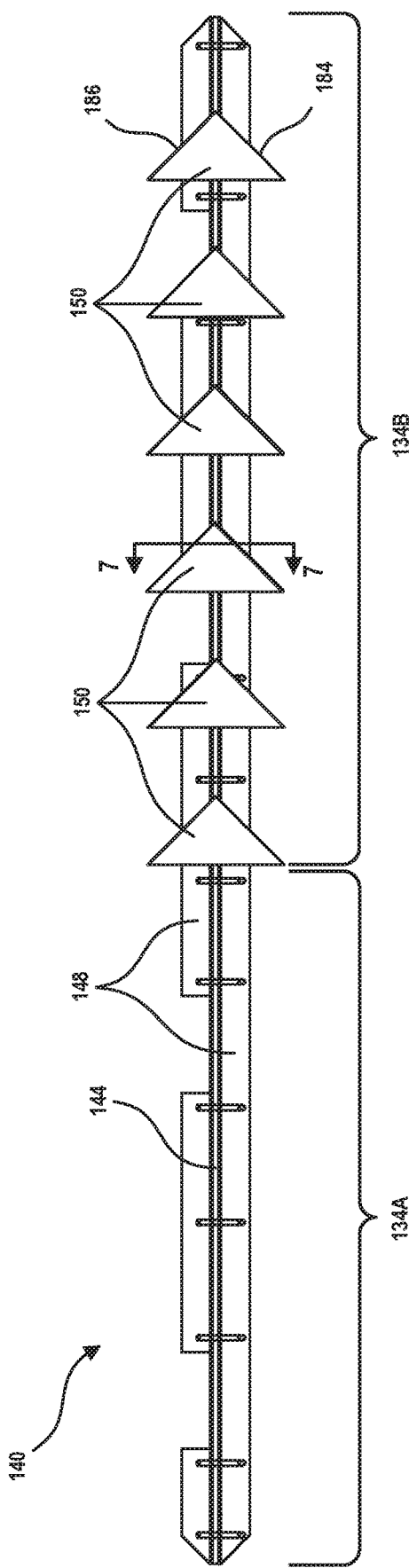
FIG. 5 is a plan view of the example paddle and flingers of FIG. 4.
Figure 6:
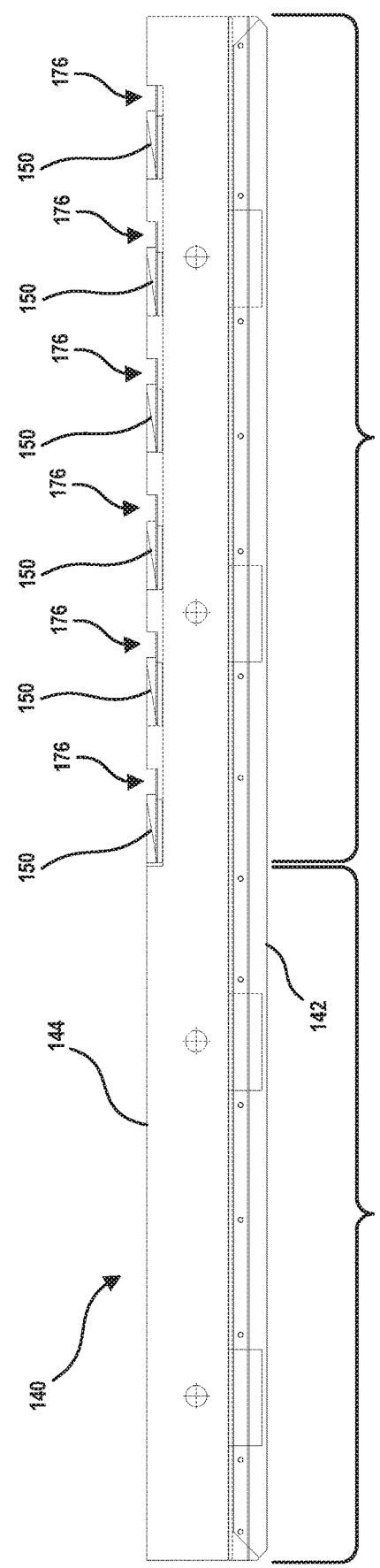
FIG. 6 is a side elevation view of the example paddle and flingers of FIGS. 4 and 5.
Figure 7A:
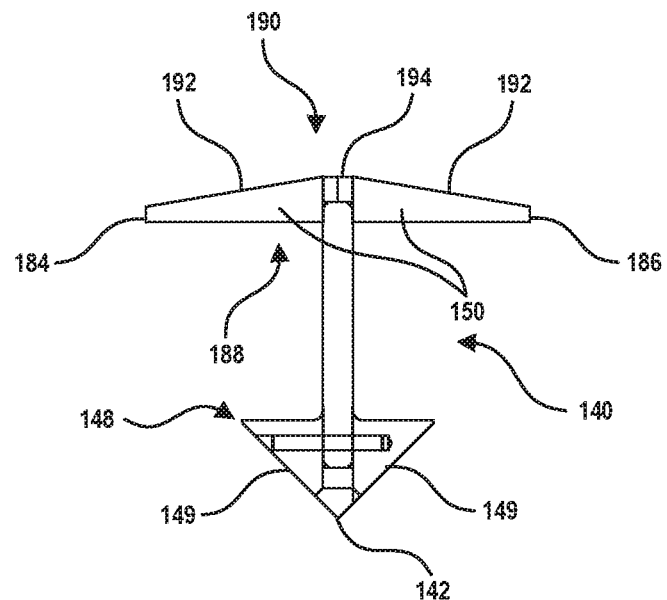
FIG. 7A is a cross-sectional end view of example paddle and flingers that can be used in the conveyor of FIGS. 1, 3A, and 3B, taken along section line 7-7 in FIG. 5.

In an example, one or more of the paddles 140, and in some examples each of the paddles 140, includes a wedge bar 148 located at or proximate to the proximal edge 142 (as seen in FIG. 7A). The wedge bar 148 extends laterally outward from both sides of the paddle 140 and extends axially along a substantial length of the paddle 140, for example along the entire length or substantially the entire length of the paddle 140 (although the wedge bar 148 can include gaps that accommodate the support arms 146, as seen in FIG. 5).

The wedge bar 148 has a profile or cross-sectional shape at leading edge (e.g. the side of the paddle 140 that encounters material when the conveyor 130 is rotating, which depends on which direction the conveyor 130 is rotating), as seen in FIG. 7A. The profile is such that it prevents or minimizes buildup of material, and in particular solids material, at the proximal edge 142 of the paddle 140. For example, the wedge bar 148 includes a tapered or sloped face 149 on the leading side of the paddle 140 (which will depend on the direction of rotation). In an example, the wedge bar 148 includes a tapered face 149 on both sides of the wedge bar 148 (as seen in FIG. 7A) so that the material buildup on the proximal edge 142 of the paddle 140 will be minimized regardless of which direction the conveyor 130 is rotated.

In an example, seen in FIG. 7A, the profile or cross-sectional shape of the wedge bar 148 is triangular or substantially triangular in shape, for example with the shape of an isosceles triangle with a base spaced radially from the proximal edge 142 and extending laterally outward normal or substantially normal to the plane of the paddle 140 and the two tapered faces 149 are of equal or substantially equal length on either lateral side of the paddle 140, with the tapered faces 149 extending radially inward and laterally inward to an apex at or proximate to the proximal edge 142. In other words, in an example the profile of the wedge bar 148 is symmetrical or substantially symmetrical about the plane of the paddle 140 and forms a triangular wedge that is narrowest at the apex at or proximate to the proximal edge 142 and widens as the wedge bar 148 extends radially towards its base.

In an example, the conveyor 130 includes a plurality of paddles 140 that are uniformly or substantially uniformly spaced about the axis 114 about the shaft 132 (e.g., adjacent paddles 140 are oriented at an angle relative to one another). In an example, the number of paddles 140 can range from two (2) to ten (10) paddles 140. In another example, the number of paddles 140 is from two (2) to eight (8) paddles 140, such as from three (3) to seven (7) paddles, for example from four (4) to six (6) paddles, such as five (5) paddles. In yet another example, the number of paddles 140 is four (4). In the example shown in FIGS. 1, 3A, and 3B, the paddles 140 are uniformly or substantially uniformly spaced about the axis 114 such that the angle between adjacent pairs of the paddles 140 is equal or substantially equal around the entire shaft 132. For example, if the conveyor 130 includes a total of four (4) paddles (e.g., a first paddle 140A, a second paddle 140B, a third paddle 140C and a fourth paddle 140D, as seen in FIGS. 3A and 3B), then the first paddle 140A can be angled at 90° relative to the second paddle 140B on one side and at 90° relative to the fourth paddle 140D on the other side. Similarly, the second paddle 140B can also be angled at 900 relative to the third paddle 140C on a side opposite to the first paddle 140A, and the third paddle 140C can also be angled at 90° relative to the fourth paddle 140D on a side opposite to the second paddle 140B. In this way, the first and third paddles 140A and 140C can be generally parallel to each another and can be positioned on opposite sides of the shaft 132 (e.g., 1800 from each other). Similarly, the second and fourth paddles 140B and 140D can be generally parallel to each other and positioned on opposite sides of the shaft 132 (e.g., 1800 from each other) and can also be generally perpendicular to the first and third paddles 140A, 140C.

In an example, a portion of one or more of the paddles can also include a plurality of flingers 150 that are coupled to the distal edge 144 along a portion of the length of the paddle 140. Further details regarding the flingers 150 are described in more detail below. In the example shown in FIGS. 1, 3A, 3B, and 4-7A, the paddles 140 axially extend generally along the entire length L of the housing 106, but only include the flingers 150 along the portion of the length $L_B$ corresponding to the second conveyor section 134B that is in the second zone 116B of the apparatus 100. In other words, the paddles 140 do not include flingers 150 along the portion of the length $L_A$ corresponding to the first conveyor section 134A that is in the first zone 116A, but rather only include flingers along the portion of the length $L_B$ corresponding to the second conveyor section 134B in the second zone 116B. Although the apparatus 100 is shown with each paddle 140 extending along the entire length L of the housing 106 (e.g., along the combined length $L_A$ of the first zone 116A and the length $L_B$ of the second zone 116B), those of skill in the art will appreciate that the apparatus 100 can include separate axially positioned paddles 140 for the first zone 116A and for the second zone 116B without varying from the scope of the present disclosure.

As the shaft 132 rotates, the relatively large surface area of the paddles 140 will force the liquid medium and solids material radially outward toward an inner surface of the screen 102 due to centrifugal force acting on the liquid medium and solids material. In an example, the angled or tapered shape of the wedge bar 148 (described above) also acts to force the liquid medium and the solids materially radially outward toward the inner surface of the screen 102. When the material encounters the screen 102, at least a portion of the liquid medium is forced through the openings 104 in the screen 102 to an exterior of the screen 104 because of the centrifugal force, while the solids material is retained within the interior space of the screen 102 because the solids material comprises particles that are larger than the size of the openings 104. In an example, the first conveyor section 134A primarily only drives the liquid medium and the solids portion radially outward due to the rotation of the shaft 132 and the paddles 140, while axial movement of the liquid medium and the solids portion occurs mainly due to fluid flow of the liquid portion to fill space vacated by the other material that has been conveyed axially forward by the second conveyor section 134B (described in more detail below). In other examples, the first conveyor section 134A of the conveyor 130 can include structures (not shown) that are configured to drive the liquid medium and the solids portion axially along the interior space within the screen 102, such as one or more flights, which can be arranged in a helical configuration that will act to push material through the apparatus similar to screws or auger-like structures. Some non-limiting examples of conveying structures that can be included in a first portion of a mechanical separation apparatus are described in U.S. Pat. No. 9,376,504, entitled "HYBRID SEPARATION," issued on Jun. 28, 2016, U.S. Pat. No. 9,718,006, entitled "MULTI-ZONE SCREENING APPARATUS," issued on Aug. 1, 2017, and U.S. application Ser. No. 15/796,446, filed on Oct. 27, 2017, entitled "DESIGN IMPROVEMENTS FOR MECHANICAL SEPARATION DEVICES," the entire disclosures of which are hereby incorporated herein by reference as if reproduced in their entireties.

In an example, the second conveyor section 134B of the conveyor 130 is axially adjacent to the first conveyor section 134A. As noted above, the second conveyor section 134B generally corresponds with the second zone 116B of the apparatus 100. As with the first conveyor section 134A, the second conveyor section 134B can include a plurality of paddles 140 that extend axially along the length $L_B$ of the second screen section 102B. As described above, in the example shown in FIGS. 1, 3A, 3B, and 4-7A, each paddle 140 extends along substantially the entire length L of the housing 106 so that each paddle 140 acts as a paddle for both the first conveyor section 134A and for the second conveyor section 134B. However, those of skill in the art will appreciate that the conveyor can include a first set of paddles 140 for the first conveyor section 134A and a second set of paddles 140 for the second conveyor section 140 without varying from the scope of the present disclosure.

As noted above, each paddle 140 can include one or more flingers 150 that are coupled to the distal edge 144 along at least a portion of the length $L_B$ of the second conveyor section 134B. In an example, the flingers 150 comprise individual triangular or wedge-shaped segments that are coupled to the distal edge of the paddle 140. As described in more detail below, the flingers 150 are configured to help push the solids material, e.g., the fiber, axially toward the discharge chute 120. In an example, the number of flingers 150 can range from two (2) to twelve (12) for each paddle 140, such as from two (2) to ten (10) flingers 150 per paddle 140, for example from three (3) to nine (9) flingers 150, such as from four (4) to eight (8) flingers 150, for example from five (5) to seven (7) flingers 150, per paddle 140, such as six (6) flingers 150 per paddle 140. The number of flingers 150 and paddles 140 can be selected depending on one or more factors, including, but not limited to, the flow rate of solids in the fed material, the flow rate of the liquid medium and solids material fed to the apparatus 100, or a desired flow rate of dewatered solids to be discharged from the apparatus 100.

The gap between the screen 102 and the distal edges 144 or the flingers 150 of the paddles 140 can be adjusted down to as low as about 0.625 inches (about 1.59 centimeters (cm)). A smaller gap results in dewatered solids having a lower moisture content (e.g., a drier cake), provides for a higher capacity for the apparatus 100, and can also result in purer fiber when the apparatus is used in a wet corn milling or dry grind milling process. A larger gap results in dewatered solids having a higher moisture content (e.g., a wetter cake) and a lower capacity for the apparatus 100, but can also result in a purer protein stream in the liquid medium that passes through the screen openings 104 when the apparatus is used in a wet corn milling or dry grind milling process.

The specific design and configuration of the flingers 150 can help facilitate the axial movement of the solids material along the length $L_B$ of the second conveyor section 134B to meet the requirements of a particular application. The details of the flingers 150 will be described with reference to FIGS. 4-7A. However, the present disclosure is not limited to the particular configuration shown in FIGS. 1, 3A, 3B, and 4-7A.

With further reference to FIG. 1, a motor 152 is operatively coupled to the shaft 132 for rotation of the conveyor 130 about the central axis 114. A controller, shown schematically at 154, can be operatively coupled to the motor 152 for controlling the rotational speed of the conveyor 130, which may be constant or variable. Rotation of the shaft 132 may be achieved by a suitable motor 152 or other motive force-generating device, as understood in the art. For example, one end of the shaft 132 may be operatively coupled to an electric motor so as to cause the shaft 132 to rotate about the central axis 114. In an example, the controller 154 is a computer that can control the rotational speed of the shaft 132. Such a controller 154 is generally known to those of ordinary skill in the art. The rotational speed of the shaft 132 may be selectively varied depending on the specific application. In an example, the shaft 132 is rotated at a rotational speed (e.g., measured in revolutions per minute or "RPM") ranging from about 100 RPM to about 2000 RPM (e.g., from about 1.67 hertz (Hz) to about 33.33 Hz). In another example, the rotational speed ranges from about 400 RPM to about 1000 RPM (e.g., from about 6.67 Hz to about 16.67 Hz). In another example, the rotational speed ranges from about 500 RPM to about 900 RPM (e.g., from about 8.33 Hz to about 15 Hz). A higher rotational speed provides higher capacity for the apparatus 100, but consumes more power. Other factors can also affect the capacity of the apparatus 100, including, but not limited to: the extent of elevation of the discharge end 110 (described in more detail below); the size of the openings 104 in the one or more screens 102; and the configuration of the paddles 140. Those of skill in the art will appreciate that considering the relationship between each of these factors (as well as other factors that can affect capacity of the apparatus 140) will be helpful when increasing capacity. As will be appreciated by those of ordinary skill in the art, these values for the rotational speed are exemplary and that the actual rotational speed used may be selected and optimized to meet the specifications of a particular application.

In an example, the operative coupling of the motor 152 to the shaft 132 is a direct coupling, e.g., wherein the motor 152 acts directly on the shaft 132 (with or without a gear mechanism) such that the axis of rotation of the motor 152 is coaxial or substantially coaxial with the central axis 114 of the shaft 132. In an example, as seen in the enlarged view of FIG. 8, a coupling mechanism 155 directly operatively couples the motor 152 to the shaft 132. Direct operative coupling of the motor 152 to the shaft 132 is in contrast to previous drive mechanisms for similar mechanical separation devices, which involved the use of one or more drive belts, including those described in U.S. Pat. No. 9,718,006, entitled "MULTI-ZONE SCREENING APPARATUS," issued on Aug. 1, 2017, and U.S. application Ser. No. 15/796,446, filed on Oct. 27, 2017, entitled "DESIGN IMPROVEMENTS FOR MECHANICAL SEPARATION DEVICES," the entire disclosures of which are hereby incorporated herein by reference as if reproduced in their entireties. Direct driving of the shaft 132 by the motor 152, rather than indirect driving through a drive belt, can lengthen the life of the shaft 132 because the shaft 132 is not being subjected to both rotational force (torque) and a lateral force such as is exerted on a shaft by tension forces from the drive belt. The inventors have found that the high rotational speeds and the large tension force exerted by drive belts can cause even heavy-duty steel shafts to fail and even snap after prolonged use. However, the inventors have found that, surprisingly, by using a direct drive motor 152, the life of the shaft 132 can be extended substantially beyond what was experienced for comparably sized shafts driven at comparable rotational speeds. In an example, the motor 152 comprises the General Electric (GE) electrical motor having model number 5KS447SAA408D5 (125 horsepower (HP), 460 volt (V), 60 Hz, 900 RPM) and the coupling 155 comprises a Hercuflex FX 3 coupling (maximum bore 4.25 inches) sold by Lovejoy, Inc., Downers Grove, IL.

In an example, the shaft 132 can be supported by one or more bearing mechanisms 156, which in turn can be supported by a support structure such as a support frame 158. In an example, each bearing mechanism 154 comprises an oil bath bearing, which can have a longer life with less maintenance required compared to other bearing mechanisms. In an example, each bearing mechanism 156 comprises a Ductile Iron Pillow Block Housing Model Number SAF522-D with Bearing 22222-E1-K, sold under the FAG brand by Schaeffler Group US Inc., Fort Mill, South Carolina, USA.

With further reference to FIG. 1, the apparatus 100 can include one or more removable access panels 162, for example which can be situated on a top side of the housing 106. The access panels 162 can provide for access to the interior of the housing 106.

The apparatus 100 may have a length to diameter (L/D) ratio greater than two. In one embodiment, the apparatus 100 may have a L/D ratio between approximately 2:1 and 10:1, and more preferably between 4:1 and 6:1. These values are exemplary and those of ordinary skill in the art will recognize other ratios suitable for a particular application.

As discussed above, the material to be filtered is fed to the feed inlet 118 of the apparatus in a feed direction that is angled relative to the central axis 114 of the shaft 132, and in a preferred embodiment in a feed direction that is perpendicular or substantially perpendicular to the central axis 114 of the shaft 132. In such a configuration, the material being fed into the feed inlet 118 is, therefore, forced into the shaft 132 in a direction that is also angled with respect to the shaft 132, and in the preferred configuration in a direction that is perpendicular to the shaft 132. The fed material is than redirected so that it will move generally axially along the housing 106, e.g., in the same direction as the length L of the housing 106. This change in direction inherently involves one or more structures of the apparatus 100 absorbing at least a portion of the kinetic energy from the material in the feed direction. The shaft 132 in particular can absorb a large portion of this energy because the shaft 132 is typically the first component of the apparatus 100 that the material encounters upon being fed into the apparatus 100. The inventors of the present subject matter have found that over time this absorption of energy by the shaft 132 can result in wear on the shaft 132 at the point where the material is fed into the apparatus 100, e.g., on the portion of the shaft 132 that is aligned with the inlet opening 130 or that is proximate thereto. In particular, the solids material that is to be filtered from the slurry can be particularly abrasive to the shaft 132, especially for certain kinds of solids materials, such as the fiber and other grit from a corn milling process In processes where the slurry is being fed at relatively high feed rates, this wearing of the shaft 132 can be severe enough so as to lead to mechanical breakdown of the shaft 132 after a short operation life, in severe cases as quickly as in six (6) months or less, and in some examples as quickly as three months.

Figure 8:
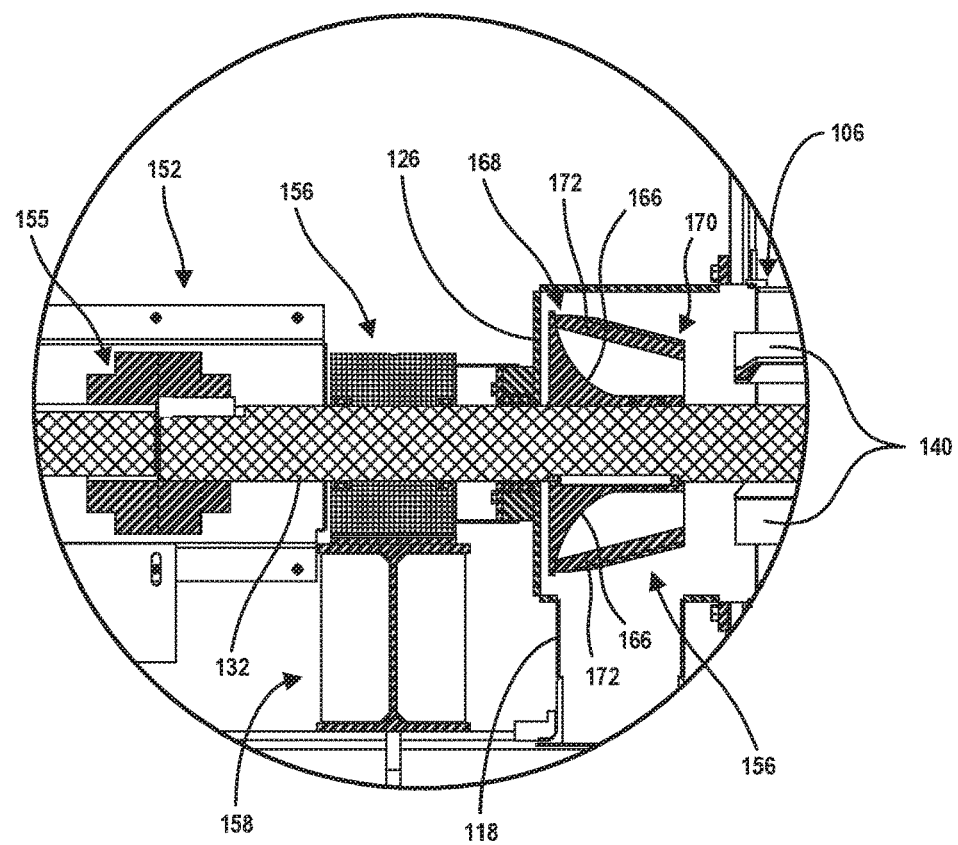
FIG. 8 is an enlarged cross-sectional side view of a feed end of the example mechanical separation device of FIG. 1, which is circled and marked "8".

In an example, the apparatus 100 includes a shaft inlet cover 164 that is placed over the shaft 132 at or proximate to the feed inlet 118, for example within the feed housing 126 as shown in FIG. 1 and the enlarged view of FIG. 8. The shaft inlet cover 164 can be coupled to the shaft 132 so that the shaft inlet cover 164 rotates as the shaft 132 is rotated by the motor 152. The shaft inlet cover 164 serves two functions. First, the shaft inlet cover 164 covers the shaft 132 at or proximate to the exact location where the slurry material is fed into the apparatus 100 and where the material first comes into contact with the conveyor 130 and provides the shaft 132 with extra protection against the abrasive wear described above. Second, the shaft inlet cover 164 includes one or more tapered guiding surfaces 166 (as in the enlarged view of FIG. 8), which assist in changing the direction of the slurry material from the radial feed direction that it is travelling when it enters the apparatus 100 through the inlet opening 128 (e.g., perpendicular or substantially perpendicular to the central axis 114 of the shaft 132) to a conveying direction along the housing 106 that is axial or substantially axial (e.g., parallel or substantially parallel to the central axis 114). As can be seen in the example of FIG. 8, the tapered guiding surfaces 166 can comprise a sloping surface that changes direction from a portion that is perpendicular or nearly perpendicular to the central axis 114 (e.g., within about 2° to about 5° of perpendicular) at a first axial end 168 of the shaft inlet cover 164 to a portion that is parallel or nearly parallel to the central axis 114 (e.g., within about 2° to about 5° of parallel) at a second axial end 170 of the shaft inlet cover 164.

In an example, the shaft inlet cover 164 also comprises a segmented shroud that at least partially covers the one or more tapered guiding surfaces 166. In an example, the segmented shroud comprises one or more shroud flanges 172 that are uniformly or substantially uniformly spaced about the axis 114 around the radially outermost edge of the one or more tapered guiding surfaces 166 (as in FIGS. 3A, 3B, and 8). The shroud flanges 172 extend out from the crests 174 of the tapered guiding surfaces 166 (e.g., the ends of the tapered guiding surfaces 166 that are radially the farthest spaced from the shaft 132) to partially obscure the tapered guiding surfaces 166. As the shaft 132 and the shaft inlet cover 164 are rotated by the motor 152, the shroud flanges 172 of the segmented shroud act to break up the incoming slurry material such that the force that is exerted on the shaft 132 by the slurry material is not constant and continuous. This acts to further protect the shaft 132 and the shaft inlet cover 164 from abrasion and wear by the slurry material, and particular from abrasion and wear by the solids material in the slurry.

The apparatus 100 can include features or structures in addition to those described above, including, but not limited to, an optional liquid inlet into the apparatus 100 in order to feed wash water into one or both zones 116A, one or more outlets for withdrawing liquid (including wash water or liquid medium) from the housing 106; or one or more baffles between the first and second zones 116A and 116B to control compaction in the first zone 116A and the amount of liquid medium that can be moved from one zone to the next (such as from the first to the second zone 116A, 116B)

To facilitate understanding of various aspects of the invention, operation of the apparatus 100 will now be described in the context of fiber filtration in a corn milling process, e.g., in a wet milling or dry grind milling processes. It should be appreciated, however, that the apparatus 100 may be used in a wide range of applications, including wet or dry milling processes for grains other than corn, and is not limited in use to either the corn wet mill or dry mill process described herein.

With reference again to FIG. 1, the motor 152 is activated to initiate rotation of the shaft 132 at its designated speed, as described above. A slurry comprising a liquid medium and a solids material is supplied into the feed housing 126 through the inlet opening 128. The one or more tapered guiding surfaces 166 of the shaft inlet cover 164 change the direction of flow of the slurry from the feed direction (e.g., perpendicular or substantially perpendicular to the central axis 114) to the conveying direction (e.g., parallel or substantially parallel to the central axis 114) and direct the flow of the slurry into the interior space within the first screen section 102A that generally corresponds with the first zone 116A. In one example, the linear velocity at which the slurry is introduced into the apparatus 100 can be the same, or close to the same, as the tangential linear velocity of the first conveyor section 134A at the surface of the first screen section 102A so as to conserve on power consumption and maximize separation of the liquid medium and material. To help control the linear velocity at which the slurry is introduced into the apparatus 100, the feed inlet 118 or a portion thereof can be tailored to, or may be adjustable, so that the feed inlet 118 or a portion thereof has a desired shape or size, e.g., diameter. The desired size or shape of the feed inlet 118, such as the size of the feed opening 128, for example, can be dependent upon the feed rate and/or feed pressure of the liquid medium and material.

The rotation of the shaft 132 and, thus, the paddles 140 directs the slurry radially outward toward the first screen section 102A, which corresponds with the first zone 116A, to filter the solids material from the liquid medium. The rotation of the shaft 132 can also act to move the solids material and remaining liquid medium along the length $L_A$ of the first screen section 102A. The solids material, e.g., fiber, is filtered from at least a portion of the liquid medium by allowing water, starch, gluten, fat or oil, and relatively small solid particles that are in the slurry to pass through the openings 104 in the first screen section 102A and drain into the hopper 124, while solids particles from the slurry that are larger than the openings 104 as well as a portion of the liquid medium are retained within the interior space in the screens 102.

The solids material, e.g., the fiber, is eventually conveyed through the first screen section 102A and into the interior space of the second screen section 102B in the second zone 116B. Rotation of the paddles 140 in the second zone 116B directs the solids material radially outward toward the second screen section 102B and is moved along the length of the second screen section 102B so that the solids material is further dewatered and filtered from the liquid medium. Also, in some examples, the flingers 150 coupled to the paddles 140 act to further compress the solids material against the inner surface of the second screen section 102B and forces additional liquid medium through the openings 104 in the second screen section 102B (described in more detail below). The water, starch, gluten, fat or oil, and relatively small particles of the slurry that are forced through the openings 104 in the second screen section 102B drain into the hopper 124. The flingers 150 also act to axially convey the solids material (e.g., fiber) along the length $L_B$ of the second zone 116B towards the discharge chute 120. In some examples, at the end of second zone 116B, the solids material is concentrated so that its moisture content is from about 50% to about 80% liquid (e.g., water).

After exiting the apparatus 100 via the discharge chute 120, the solids material can be further processed to result in a desired product. Moreover, the liquid medium that passes through the screens 102 and is collected in the hopper 124 can also be further processed, for example by combining the separated liquid medium (which can include starch) with the process stream that is fed into one or more of a liquefaction process, a saccharification process, or a fermentation process.

Turning back to FIGS. 4-7A and as mentioned above, the paddles 140 and the flingers 150 are configured to not only direct the liquid medium and the solids material in the interior space within the second screen section 102B radially outward toward the second screen section 102B, but also the actively drive the solids material in the interior space in the axial direction along the length $L_B$ of the second zone 116B. In an example, the flingers 150 comprise a triangular or wedge-shaped body (as in FIGS. 4, 5, and 7A). The shape and orientation of the flingers 150 can further act to drive the solids material axially along the second zone 116B.

In an example, each paddle 140 includes a notch 176 in the distal edge 144 on a downstream side of a leading edge of each of one or more corresponding flingers 150 of the paddle 140. Alternatively (not shown), one of more of the notches 176 can be located on an upstream side of the corresponding flinger 150. As described in more detail below, the notches 176 assist in capturing material, and in particular solids material, that has collected on the inner surfaces of the second screen section 102B after having been forced there by the paddles 140. The size of each notch 176 (e.g., the axial distance that each notch 176 extends along the distal edge 144 of the paddle 140, which may also be referred to as the notch length, and the radial distance that each notch 176 extends downward from the distal edge 144, which may also be referred to as notch depth) can be selected depending on one or more of: the specified rotational speed at which the conveyor 130 will be rotated (e.g., the number of revolutions per minute at which the apparatus 100 is designed to be run), or the specified feed rate of solids material that are to be filtered by the apparatus 100 (e.g., the mass flow rate of dewatered solids material for which the apparatus 100 is designed). The notches 176 can have a profile described as rectangular or a profile described as contoured in which some portion includes a radius.

In an example, the flingers 150 on one paddle 140 are axially staggered with respect to the flingers 150 of an adjacent paddle 140, e.g., so that the flingers 150 of the first paddle 140 are axially staggered from the flingers 150 of the adjacent second paddle 140 as seen in FIGS. 1, 3A, and 3B. For example, in the embodiment shown in FIGS. 1, 3A, and 3B, the flingers 150A on the first paddle 140A are at first axial positions relative to the paddle 140A and the shaft 132, while the flingers 150B on the second paddle 140B (which, as described above, is spaced from the first paddle 140A by 900 about the axis 114) are positioned at second axial positions relative to the paddle 140B and the shaft 132 that is axially spaced slightly relative to the flingers 150A of the first paddle 140A. In an example, the staggering of the flingers 150 is such that the flingers 150 of the adjacent second paddle 140 are axially aligned with an axial portion of the distal edge 144 of the first paddle 140 that does not have a flinger. In an example, the notches 176 of the first paddle 140 are similarly staggered with respect to the notches 176 of the second paddle 140.

In an example, as in FIG. 1, the flingers 150A of the first paddle 140A are axially spaced from the flingers 150B of the next adjacent paddle, e.g., the second paddle 140B, so that a leading edge of the flingers 150A of the first paddle 140A are axially aligned or substantially axially aligned with a trailing edge of the flingers 150B of the second paddle 140B, as indicated by the dashed lines 178 in FIG. 1. In some examples, the paddles 150A and 150B are also sized and axially aligned so that a leading edge of the flingers 150B of the second paddle 140B are axially aligned or substantially axially aligned with the trailing edge of the flingers 150A of the first paddle 140A, as indicated by the dashed lines 180 in FIG. 1. There can be similar axial alignment between the leading edges of the flingers 150B of the second paddle 140B and the trailing edges of the flingers 150C of the third paddle 140C (FIGS. 3A and 3B), and with the leading edges of the flingers 150C of the third paddle 140C with the trailing edges of the flingers 150D of the fourth paddle 140D (FIG. 3B). In the example where there are four evenly spaced paddles 140 (e.g., spaced 90° apart as described above with the paddles 140A, 140B, 140C, and 140D), a leading edge of the flingers 150D of the fourth paddle 140D can be axially aligned or substantially axially aligned with the trailing edge of the flingers 150A of the first paddle 140A.

In an example, the conveyor 130 can be configured so that the spacing between the paddles 140 or the flingers 150 and the inner surfaces of the screen 102 can be minimized. For example, the connection between the shaft 132 and a paddle 140 can include an adjustable mechanism so that the distance that the paddle 140 radially extends away from the shaft 132 can be changed. In an example, the connection between each paddle 140 and the shaft 132 is via one or more corresponding support arms 146 that connect to the paddle 140 at or proximate to one end of the arm 146 and to the shaft 132 at or proximate to an opposite end of the arm 146. In an example, seen in FIGS. 3A and 3B, the connection between an arm 146 and one or both of the shaft 132 or a corresponding paddle 140 is with one or more nuts 182, which can each engage a threaded bolt or post (not shown). In an example, the one or more nuts 182 that connect one of the support arms 146 to a corresponding paddle 140 comprises one or more eccentric nuts 182 that can allow the position of the support arm 146 relative to the paddle 140 to be reliably and controllably adjusted in order to move the paddle 140 either radially inward toward the shaft 132 (e.g., farther away from the inner surfaces of the screens 102) or radially outward away from the shaft 132 (e.g., closer to the inner surfaces of the screens 102). As used herein, the term "eccentric nut" refers to a nut with a threaded bore that is offset from the center of the external flats. In this way, the one or more eccentric nuts 182 act as the adjustable mechanism that can change the distance that a paddle 140 extends away from the shaft 132, and therefore can change how close the distal edge 144 will be to the inner surfaces of the screen 102. In an example, the eccentric nuts 182 are configured to adjust the relative position of the paddle 140 relative to the support arm 146 to which it is connected in increments of about $\frac{1}{16}$ of an inch (about 1.6 millimeters (mm)).

Figure 4:
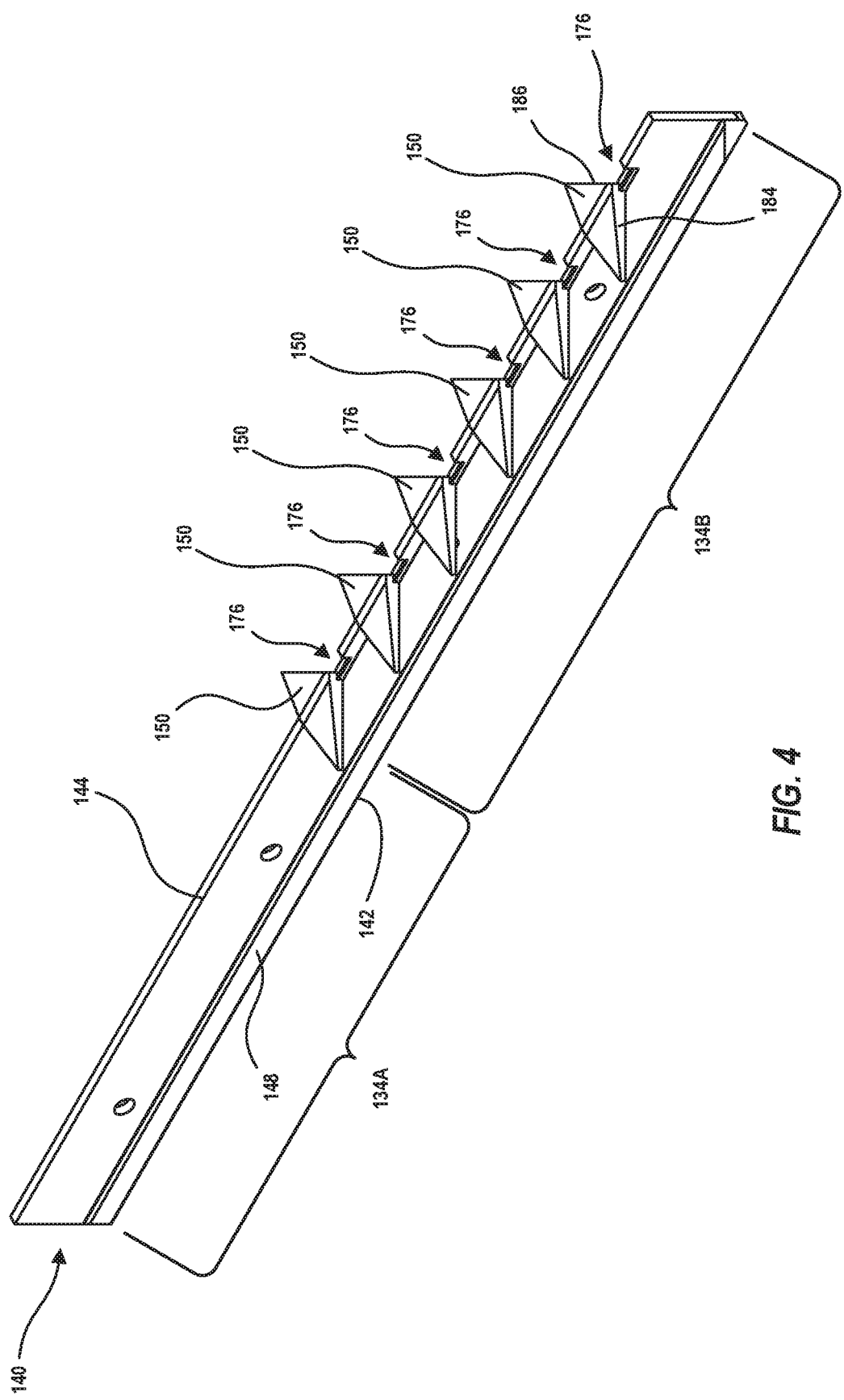
FIG. 4 is an isometric view of an example paddle having a plurality of example flingers that can be used in the example mechanical separation device of FIG. 1.

In an example, seen in FIGS. 4, 5, and 7A, each flinger 150 comprises a chevron configuration having a wedge shape, e.g., with a first leading edge 184 on a first side of the paddle 140 (e.g., the bottom edge as shown in FIG. 5 or the left edge as shown in FIG. 7A) and a second leading edge 186 on an opposite side of the paddle 140 (e.g., the top edge as shown in FIG. 5 or the right edge as shown in FIG. 7A). The term "leading edge" refers to the fact that as the conveyor 130 is rotated, one of the edges 184, 196 will be moved into contact with material such that it leads the rest of the flinger 150. Those of skill in the art will appreciate that only one of the edges 184, 186 will truly be "leading" at an one time, and which edge 184, 186 is actually leading will depend on the direction of rotation of the conveyor 130. As the conveyor 130 rotates, one of the leading edges 184, 186 of each flinger 150 (depending on the direction of rotation) passes in close proximity to an inner screen surface of the second screen section 102B as the conveyor 130 rotates and can act to clear material, and in particular solids material, from at least a portion of the inner screen surface. In an example (seen in FIGS. 4, 5, and 7), one or more of the flingers 150, and in some examples all of the flingers 150, are symmetrical on either lateral side of the paddle 140 (e.g., symmetrical about a plane that is coextensive with a plane of the paddle 140) such that at least a portion of the second leading edge 186 is a mirror image of a corresponding portion of the first leading edge 184.

As can be seen in FIGS. 4 and 5, each leading edge 184, 186 is tapered so that the leading edge 184, 186 is more axially advanced at the center of the flinger 150 (e.g., where the flinger 150 is coupled to the distal edge 144 of the paddle 140) and is axially further back at the lateral ends of the leading edge 184, 186. This tapered aspect gives the flinger 150 its chevron-shaped body. As the flingers 150 rotation about the axis 114 due to rotation of the shaft 132, the tapered leading edges 184, 186 encounter solids material, and the solids material rides along the leading edges 184, 186 which acts to push the solids material axially forward in front of the flinger 150.

In an example, the combination of the chevron-shaped flingers 150 and the axially staggered flingers 150 on alternative paddles 140 act to further separate the liquids medium from the solids material in the second zone 116B and also actively convey the solids material axially forward through the second zone 116B in a cycle of separation and axially advancing of the solids material. For example, as the conveyor 130 is rotated, the portions of the distal edge 144 of a first paddle 140A that does not have a flinger 150A forces the material radially outward toward the inner screen surface of the second screen section 102B, which forces some of the liquid medium associated with the solids material through the second screen section 102B. As the conveyor 130 continues to rotate, the leading edge 184, 186 of a flinger 150B on the next adjacent paddle 140B (which, as described above, can be axially aligned with the portion of the distal edge 144 of the first paddle 140A that does not have a flinger 150A) will encounter at least a portion of the solids material that had just been further dewatered by the distal edge 144 of the first paddle 140A. The leading edge 184, 186 of the flinger 150B on the second paddle 140B will then act to advance at least some of the solids material axially forward to an axial position in front of (e.g., upstream) of the flinger 150B.

After the flinger 150B of the second paddle 140 axially advances at least a portion of the solids material, the cycle of separation and axially advancing the solids material can be repeated, but this time starting with the distal edge 144 of the second paddle 144B. For example, at least a portion of the solids material that had just been axially advanced by the flinger 150B can be swept up by the distal edge 144 of the second paddle 140B in front of the flinger 150B. As with the distal edge 144 of the first paddle 140A, the distal edge 144 of the second paddle 140B forces the solids material radially outward toward the second screen section 102B, which can force at least a portion of the liquid medium associated with the solids material through the second screen section 102B. Then, because the flingers 150C of the next adjacent paddle 140C, e.g., the third paddle 140C, are axially aligned with the portions of the distal edge of the second paddle 140B that does not include the flingers 150B, one of the leading edges 184, 186 of a flinger 150C on the third paddle 140C, will act to capture at least a portion of the solids material that was just dewatered by the distal edge 144 of the second paddle 140B. The tapered leading edge 184, 186 will then axially advance the solids material in front of the flinger 150C in much the same way that the leading edge 184, 186 of the flinger 150B on the second paddle 140B did. Then, once again, the cycle of separation and axially advancing the solids material can be repeated, this time with the distal edge 144 of the third paddle 140C, which dewaters at least a portion of the solids material by forcing it into the second screen section 102B, followed by a flinger 150D of the next adjacent paddle 140D (e.g., the fourth paddle 140D) encountering at least a portion of the solids material that was just dewatered by the distal edge 144 of the third paddle 140C. One of the tapered leading edges 184, 186 of the flinger 150D will then axially advance at least a portion of the solids material in front of the flinger 150D where, yet again, the cycle of separation and axially advancing the solids material, e.g., with the distal edge of the fourth paddle 140D forcing at least a portion of the solids material into the second screen section 102B to dewater at least a portion of the liquid medium followed by a flinger 150A of the next adjacent paddle, which in the example of FIGS. 3A and 3B is the original first paddle 140A. In this way, the cycle of separation and axially advancing the material the second zone 116B is repeated until the solids material is finally advanced all the way to the discharge end 110 where it is collected by the discharge chute 120. This process provided by the design of the paddles 140 and flingers 150 allows separation to be controlled across the entire length $L_B$ of the second zone 116B by adjusting the rotational speed of the conveyor 130 and/or to the size of the openings 104 in the second screen section 102B.

In an example, the number of paddles 140 and the flingers 150 are configured so that the conveyor 130 can function as a bi-directional conveyor of the solids material along the second zone 116B. As used herein, the terms "bi-directional conveyor" or "bi-directional conveying" means that the conveyor 130 is configured so that it will convey the solids material forward through the second zone 116B (e.g., toward the discharge chute 120) regardless of which direction that the shaft 132 is rotated. In particular, the combination of the axially staggered flingers 150 on adjacent paddles 140 (e.g., so that the flingers 150B on a second paddle 140B are at least partially axially aligned with the distal edge 144 of the preceding paddle 140A) and the leading edges 184 and 186 that are at least partially symmetrical on either side of the paddle 140 can provide for bi-directional conveying. In particular, such an arrangement can provide for the repeated cycle of separation and axially advancing of the solids material through the second zone 116B described above, but wherein the first leading edges 184 of the flingers 150 act to advance the solids material if the conveyor 130 is rotated in a first direction, while the second leading edges 186 of the flingers 150 act to advance the solids material if the conveyor 130 is rotated in a second direction that is opposite from the first direction. For example, if the conveyor 130 is rotated in a counterclockwise direction from the perspective shown in FIG. 7A, then the first leading edge 184 will clear the inner screen surface and axially advance the solids material. Conversely, if the conveyor 130 is rotated in a clockwise direction from the perspective shown in FIG. 7A, then the second leading edge 186 will clear the inner screen surface and axially advance the solids material.

In some examples, the flingers 150 can be shaped to provide for close spacing between the flingers 150 and the inner surfaces of the screens 102. Each flinger 150 also includes a radially inner side 188 and a radially opposing outer side 190 (as in FIG. 7A). The inner side 188 is the portion of the flinger 150 that is coupled to the distal edge 144 of the paddle 140, while the outer side 190 is the portion of the flinger 150 that is closest to the inner screen surface while the conveyor 130 is rotating. In an example, the outer side 190 comprises one or more tapered outer surfaces 192 that are radially spaced outward more at a center 194 of the flinger 150 (e.g., proximate to the distal edge 144 of the paddle 140) than at the leading edges 184, 186.

In the example shown in FIG. 7A, the tapered outer surface 192 is formed because the inner side 188 of the flinger 150 is planar or substantially planar and the flinger 150 is thicker at the center 194 than at the leading edges 184, 186, for example by first forming a "flinger blank" that has a uniform or substantially uniform thickness and then machining the blank to reduce the thickness in the desired tapered manner in order to form the tapered outer surfaces 192. The one or more tapered outer surfaces 192 can allow the flinger 150 to be positioned even closer to the inner screen surface without the leading edge 184, 186 contacting the inner screen surface.

Figure 7B:
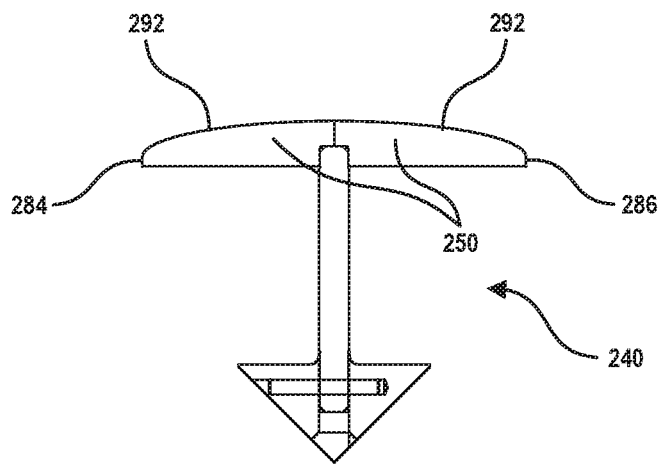
FIG. 7B is a cross-sectional end form of an alternative example paddle and flingers that can be used in the conveyor of FIGS. 1, 3A, and 3B.

FIG. 7B shows a cross-sectional end view of an alternative paddle 240 and set of flingers 250 that can be used with the conveyor 130. FIG. 7B, which is shown as a cross-sectional view similar to that of FIG. 7A, shows that the one or more tapered outer surfaces of the alternative flingers 250 including at least a portion that is a curved tapered surface 292 that tapers down to the leading edges 284 and 286. In an example, a radius of curvature of at least a portion of the curved tapered surface 292 is substantially equal to an inner diameter of the inner screen surface so that the flinger 250 and its paddle 240 can be positioned even closer to the inner screen surface.

In an example, the apparatus 100 can include a discharge raising mechanism (shown schematically at 200 in FIG. 1) that is configured to raise the discharge end 110 higher than the feed end 108, e.g., so that the discharge end 110 is elevated relative to the rest of the apparatus 100 by a specified angulation. FIGS. 10A-10F show examples of various levels of angulation for the support frame 158 (with the remainder of the apparatus 100 being omitted from FIGS. 10A-10F for clarity).

A raised discharge end 110 can cause at least a portion of the liquid medium and any solids suspended in the liquid medium to be held in the screen for a longer period of time before being collected in the hopper 124 and removed from the apparatus 100. For example, when the discharge end 110 is raised, gravity works on the material being filtered by holding it in the apparatus 100 for a longer period of time than it would be held if the discharge end 100 were not raised. This longer holding time allows the apparatus 100 to further separate additional liquid medium from the solids material because the solids material is pressed against the inner screen surface for several more revolutions of the paddles 140 before entering the second zone 116B where it can be further filtered and conveyed by the second conveyor section 134B, at which point the remaining solids material will be discharged from the apparatus 100 via the discharge chute 120.

In this way, raising the discharge end 110 with the raising mechanism can lengthen the residence time in the apparatus 100 for the material being filtered without having to alter the rotational speed or the dimensions of the components of the conveyor 130. Moreover, the higher that the discharge end 110 is raised (e.g., the large the value of angulation), the more the residence time will be lengthened because raising the discharge end will necessarily increase the apparent gravity force placed on the material as it is being processed by the conveyor 130. For example, the residence time in the apparatus 100 with an angulation of 2°, as in FIG. 10C, will be less than would be in the same apparatus 100 but with an angulation of 5°, as in FIG. 10F, and the apparatus 100 configured as in FIG. 10F (50 angulation) will have more time for separation than the apparatus 100 configured as in FIG. 10C (20 angulation). Therefore, an apparatus 100 with the angulation of FIG. 10C (20 angulation) would result in less liquid medium being separated from the solids material than would be separated in the same apparatus 100 with the angulation of FIG. 10F (50 angulation).

Raising the discharge end 110 can also allow the apparatus 100 to not only separate based on particle size, which is the primary separation mechanism due to the size exclusion of the screen openings 104 of the screens 102 when the apparatus 100 is at horizontal. Rather, because at least a portion of the liquid medium must actually flow up the incline of the raised apparatus 100, the raised apparatus also acts to at least partially separate the slurry due to density differences, for example because some lighter solids particles might more easily flow up the incline and into the second zone 116B for further dewatering while heavier solids particles might be kept in the first zone 116A at least until the level of the liquid medium in the first zone 116A raises to a high enough level for some of the liquid medium and the heavier particles to flow past the interior partition 122 and into the second zone 116B. In short, raising the discharge end 110 during operation of the apparatus 100, such as with the raising mechanism 200, can provide additional control over the residence time of the material in the apparatus 100 and can provide for more complete separation based not only on particle size, as with most conventional dewatering equipment, but also based at least partially on density differences without a substantial increase in energy input that is typically required with conventional density-based separation equipment like centrifuges or hydrocyclones.

In an example, the raising mechanism 200 can raise the discharge end 110 by up to about 10° from horizontal, such as up to about 9° from horizontal, for example up to about 8° from horizontal, such as up to about 7° from horizontal, for example up to about 6° from horizontal, such as up to about 5° from horizontal.

In an example, the raising mechanism 200 is operatively coupled to the support frame 158 at a position that allows the raising mechanism 200 to raise a portion of the support frame 158 at or proximate to the discharge end 110 in order to raise the discharge end 110 of the apparatus 100. As shown in the example of FIG. 1, the raising mechanism 200 is operatively connected to one or more legs 202 of the support frame 158 that are on the discharge side of the apparatus 100 (also referred to as the discharge legs 202).

The support frame 158 can also include a pivot mechanism such as a pivot pin 204 that allows a portion of the support frame 158 to pivot relative to the ground when the raising mechanism 200 is raising or lowering the support frame 158 in order to raise or lower the discharge end 110. In an example, the pivot pin 204 is located on one or more legs 206 of the support frame 158 that are on the feed side of the apparatus 100 (also referred to as feed legs 206), generally opposite from the discharge legs 202 to which the raising mechanism 200 is operatively coupled.

Figure 10A:
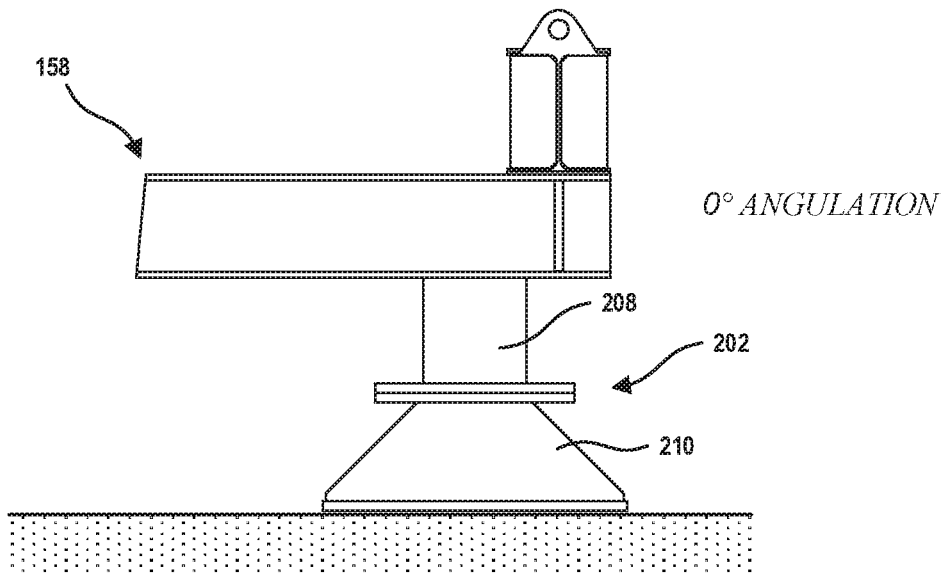
FIGS. 10A-10F are elevation views of an example adjustable support frame for the example mechanical device of FIG. 1 that can raise the discharge end of the mechanical separation device for improved separation efficiency.
Figure 10B:
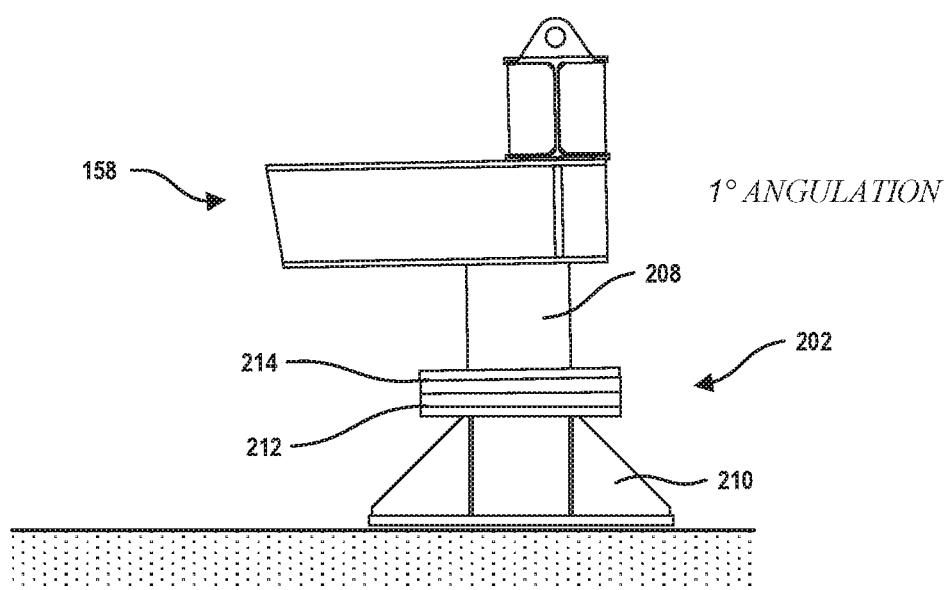
Figure 10C:
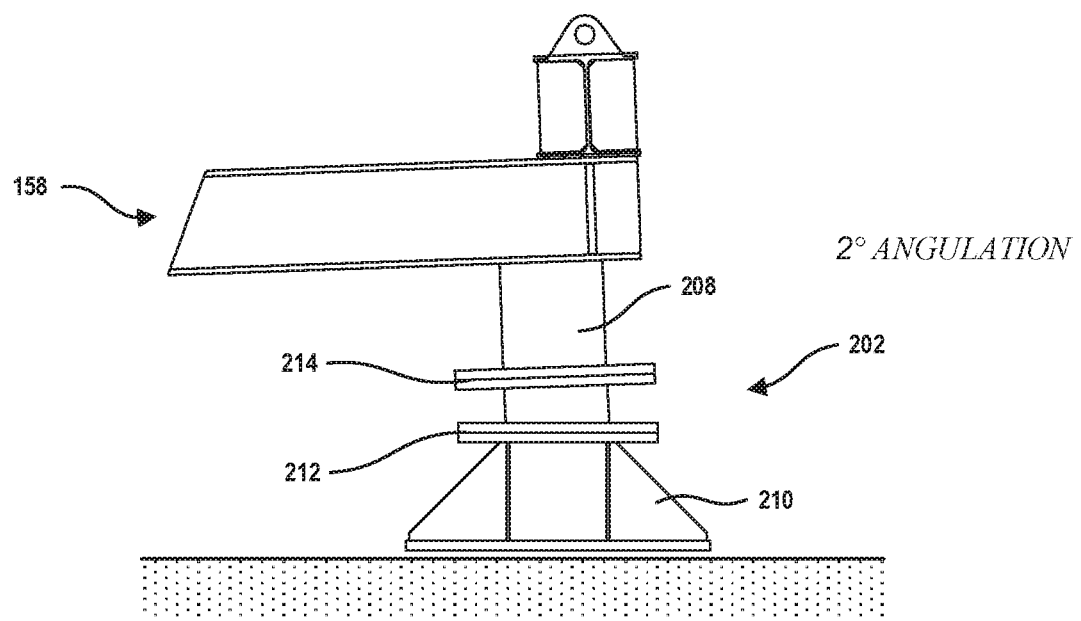
Figure 10D:
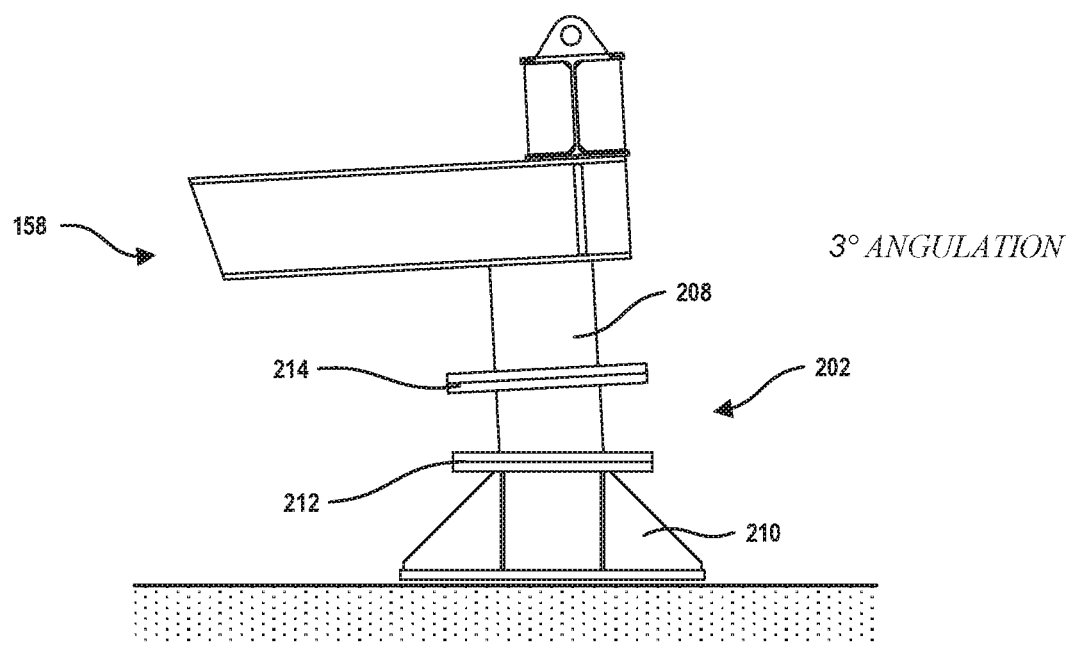
Figure 10E:
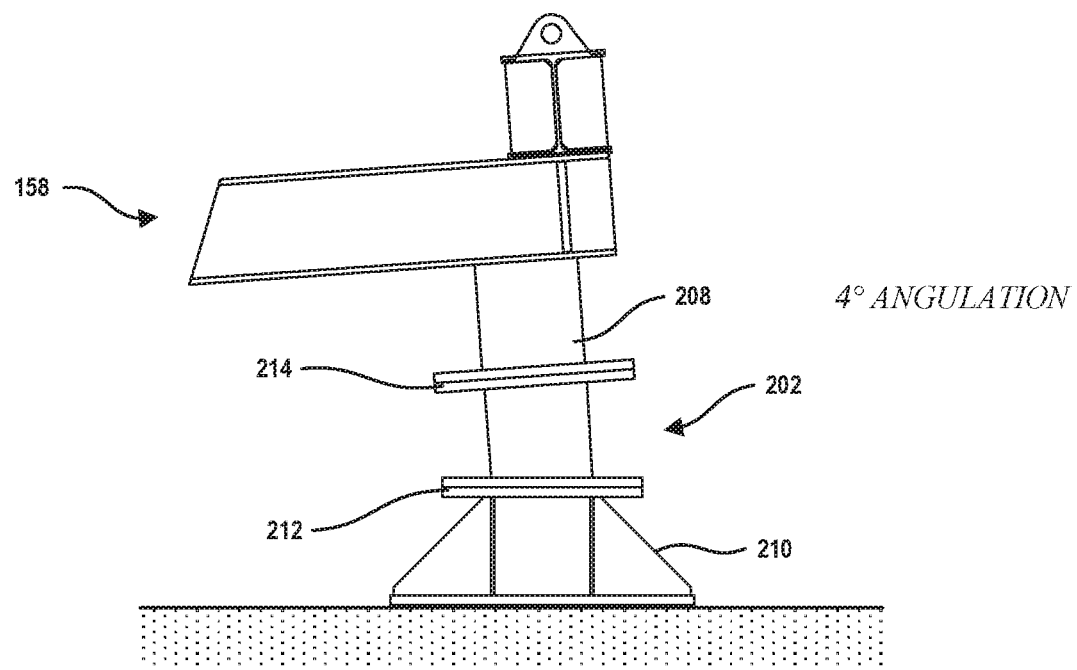
Figure 10F:
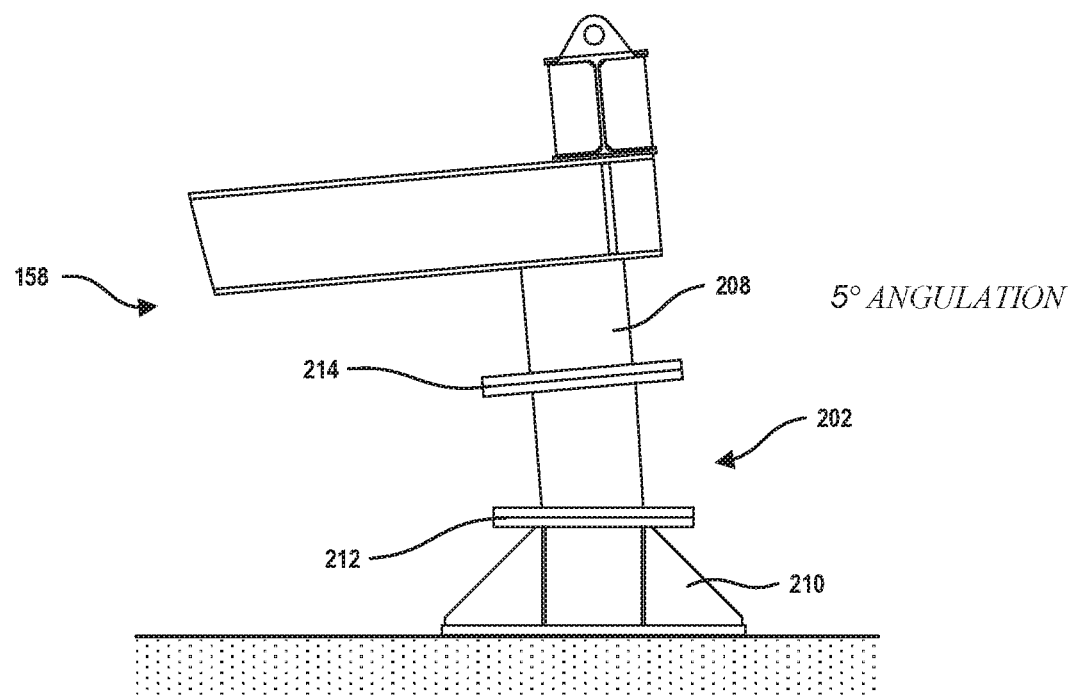

FIGS. 10A-10F show an example of the raising mechanism 200 moving the discharge side of the support frame 158 from a level or horizontal position (FIG. 10A) to a raised position where the discharge end is raised by about 5° relative to horizontal (FIG. 10F). As described above, the residence time of the material in the apparatus 100 is increased as the amount of angulation is increased, resulting in more time for separation of liquid medium from the solids material. In other words, the larger the angle of elevation, the longer the residence time and the more time for separation (both the mechanical separation due to the conveyor 130 and the screens 102 and due to the enhanced gravity/density based separation enabled by the elevated discharge end 110, described above).

As shown in FIGS. 10A-10F, the raising mechanism 200 pushes on the support frame 158 at or proximate to the discharge legs 202, such as with a hydraulic piston or other mechanism that can move the weight of the support frame 158 and the apparatus 100 at the discharge end 110. In an example, the discharge legs 202 include a telescoping mechanism with an upper leg portion 208 that fits inside or around a lower foot portion 210, wherein the leg portion 208 and the foot portion 210 are configured to be slidable relative to one another. The discharge legs 202 can also include a horizontal flange stop 212 that is connected to the lower foot portion 210 and a leg flange 212 that is connected to the upper leg portion 208. When the raising mechanism 200 is in the horizontal position, e.g., when the mechanism is not raised, or is at 0° angulation relative to horizontal (as in FIG. 10A), than the leg flange 212 rests on and is supported by the flange stop 212 such that the flange stop 212 acts as a safety stop in case the raising mechanism 200 fails and is unable to raise the discharge end 110 of the apparatus 100.

As the raising mechanism 200 raises the discharge side of the support frame 158, the upper leg portion 208 slides upward relative to the lower foot portion 210, raising the discharge side of the support frame 158 through various angles of elevation (such as the 1° of angulation shown in FIG. 10B, the 2° of angulation in FIG. 10C, the 3° of angulation in FIG. 10D, the 4° of angulation in FIG. 10E, or the 5° of angulation in FIG. 10F) while the lower foot portion 210 remains in contact with the ground. As the discharge side of the support frame 158 is raised (due to the sliding of the upper leg portion 208 relative to the lower foot portion 210), the pivot pin 204 (shown in FIG. 1) allows the support frame 158 to shift relative to the ground without buckling or breaking.

In an example, the apparatus 100 can include a moisture sensor or other moisture detection apparatus at the discharge chute 120 or downstream of the apparatus 100 that tests the moisture content of the dewatered solids cake that exits the apparatus 100 via the discharge chute 120. The moisture sensor can be monitored by a controller (which could be the same controller 154 that controls the motor 152, or it can be a separate controller). The controller, in turn, uses the moisture content of the cake that is determined by the moisture sensor to determine a set point for the elevation level for the discharge end (e.g., the selected angulation value). The controller can then use the determined set point to control the raising mechanism 200 to either raise or lower the discharge end in order to meet the newly determined set point elevation. In short, the moisture sensor is used as the input for a control loop where the controlled variable is the elevation of the raised discharge end 110.

Figure 9:
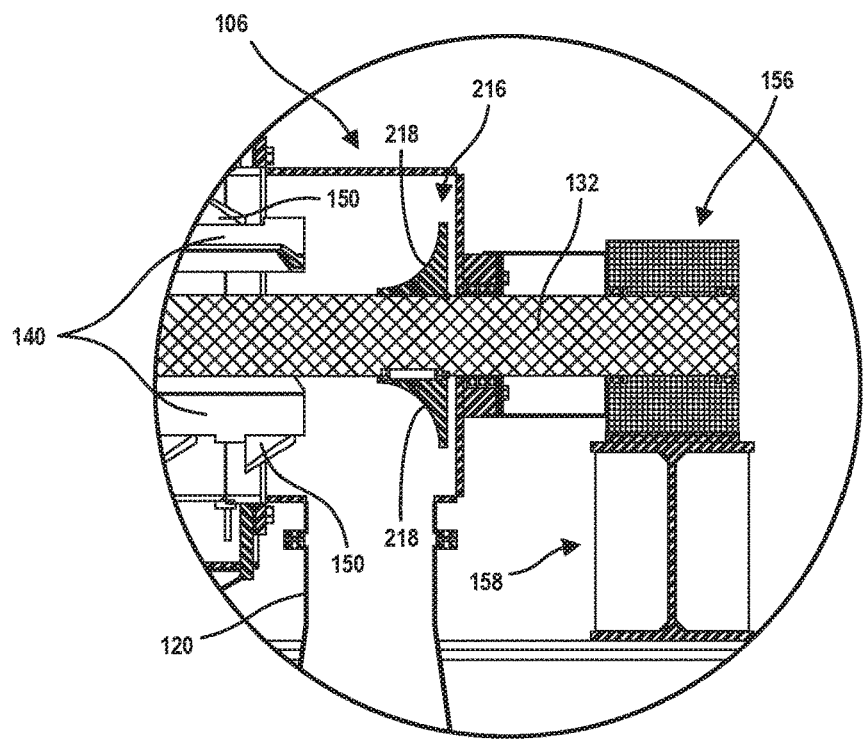
FIG. 9 is an enlarged cross-sectional side view of a discharge end of the example mechanical separation device of FIG. 1, which is circled and marked "9".

In an example, the apparatus 100 includes a shaft outlet cover 216 that serves a similar purpose to the shaft inlet cover 164 described above. The shaft outlet cover 216 is placed over the shaft 132 at or proximate to the discharge chute 120 (as shown in FIG. 1), as shown in FIG. 1 and the enlarged view of FIG. 9. The shaft discharge cover 216 can be coupled to the shaft 132 so that the shaft discharge cover 216 rotates as the shaft 132 is rotated by the motor 152. Similar to the shaft inlet cover 164, the shaft discharge cover 216 can have one or more tapered guiding surfaces 166 (as in the enlarged view of FIG. 8), which assist in changing the direction of the dewatered solids material coming out of the interior space of the second zone 116B from an axial direction (e.g., the direction in which the dewatered solids material is conveyed by the second conveying section 134B through the second zone 116B) to a radial discharge direction (e.g., perpendicular or substantially perpendicular to the central axis 114 of the shaft 132) in order to send the dewatered solids material to the discharge chute 120. As can be seen in the example of FIG. 9, the tapered guiding surfaces 218 can comprise a sloping surface that changes the direction of the dewatered solids material from an axial conveying direction that is parallel or nearly parallel to the central axis 114 (e.g., within about 2° to about 5° of parallel) to a discharge direction that is perpendicular or nearly perpendicular to the central axis 114 (e.g., within about 2° to about 5° of perpendicular), similar to the change in direction facilitated by the tapered guiding surfaces 166 of the shaft inlet cover 164 but in reverse.

The various features of the apparatus 100 culminate in a synergistic effect. For example, one or more of the features allow the apparatus 100 to be a single, self-contained device that performs dewatering of the solids material to remove additional components, such as starch and/or gluten, therefrom. The present apparatus 100 can also reduce the capital costs compared to earlier dewatering devices, and can also reduce labor and associated costs for maintaining and operating the process (e.g., because of less water use, less electricity requirement, etc.).

One or more of the features of the apparatus 100 also allow the dewatered material to exit the apparatus in a more dry condition as compared to existing filtration systems. For example, the apparatus 100 may provide the filtered material at a water concentration of between about 50% and about 80% liquid (e.g., water), which can be a significant reduction compared to conventional filtration systems. Providing a more dry product results in less wash water required for a specified purity level of the solids material, e.g., the fiber. Also, a drier product may result in additional benefits. For example, in many cases, in a corn wet milling process, the fiber collected in filtration systems is further processed by directing the fiber through a press to squeeze additional water from the fiber, and then directing the fiber through a dryer. The various apparatuses that are used to press fiber are expensive and costly to maintain and operate. Additionally, energy costs associated with dryer operation are also less expensive.

While the subject matter has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art.

In addition to the above, the apparatus 100 as described above may be found beneficial in other industrial applications. By way of example, the chemical industry utilizes a crystal formation process wherein it is desirable to bring in a bulk material, separate out the crystals contained therein, and then wash the crystals. The apparatus 100 as described herein may be used for such a process to achieve the results in a single device. Moreover, the juice industry similarly includes various processes wherein a bulk material is brought in and filtered. It may be desirable to wash the fruit or other bulk material as well. Again, the apparatus 100 as described herein may be used in such applications. Moreover, other corn or grain milling processes may benefit from filtration disclosed herein. Additionally, other industries that seek to filter a material from a medium (e.g., liquid medium or otherwise) and/or wash the material may also benefit from the screening apparatus as described herein.

The apparatus 100 described herein may also provide benefits to industries that utilize other types of filtration systems. For examples, some industries utilize decanter centrifuges and/or conic screen bowl centrifuges. Nevertheless, these centrifuges also have drawbacks which may be addressed by the apparatus 100 disclosed herein. Typically, for example, decanter centrifuges have no washing zone and therefore separate devices must be used if washing the filtered material is desired. Of course these additional devices are costly and take up space within the manufacturing facility. Additionally, the apparatus 100 described herein are able to provide a filtered material in a drier state as compared to the output of a decanter centrifuge. As noted above, providing a drier material may significantly reduce the energy costs associated with post processing of the material. Similarly, conic screen bowl centrifuges do not provide for washing of the filtered material.

The mechanical separation apparatus 100 may include, but is not limited to the apparatus as shown in FIG. 1, such as a multi-zoned screening apparatus, a paddle screen, and the like. Typically, paddle screens are mechanical devices that separate components with a wedge wire. The screen designs, bar designs and bar handle in this application are improvements to the mechanical separation device to help separate the components in a more efficient manner, to improve throughput, to reduce capital costs and to reduce shutdown time at plants. These new designs in this application offer a variety of improvements along with reducing carbon footprint, as the plants implementing these new designs on mechanical separation devices will operate more efficiently, run smother, experience less stops and starts (downtime), and require less maintenance.

Example Environment

Figure 11:
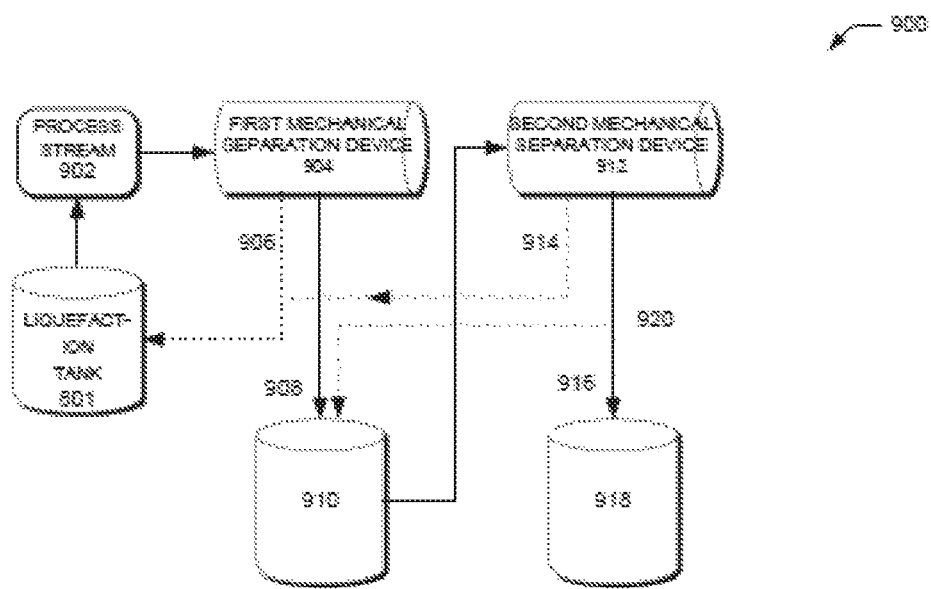
FIG. 11 is a flow diagram of an example process in which the example mechanical separation device of FIG. 1 can be used.

FIG. 11 illustrates an example of an environment of a process 900 that may use a mechanical separation apparatus 100 as described above with respect to FIGS. 1-10. The process 900 illustrates an example using a counter-flow wash process. For illustrative purposes, the liquids are identified by dotted lines to indicate being sent to a tank. These examples illustrate streams that may be sent from the mechanical separation devices and streams received into the tanks from the different mechanical separation devices. However, the liquids stream may be sent to water make up process, a receiving tank, a slurry tank, a liquefaction tank, a remix tank, and the like, while any streams may be received into the tanks from any of the mechanical separation devices. The terms, such as large-particles, larger-size particles, and solids are used to describe the materials separated by the mechanical separation devices. These tend to be considered of solids content and includes larger size particles than the liquids with small particles, which are liquids content and include smaller size particles than the solids, which will be referred to as liquids stream.

The process 900 receives a process stream 902, which may be a slurry from a slurry tank prior to being cooked or from a liquefaction tank 901. The process 900 separates the components, and may further washes the material. The process 900 sends the process stream 902 through a first mechanical separation device 904, which can be similar or identical to the example mechanical separation apparatus 100 described above or can be a different mechanical separation device entirely. The first mechanical separation device 904 separates components such as larger solid particles from the smaller particles and liquid medium a first time. This is also referred to as a first pass. The first tank 910 may contain about 40% solids content (average).

The process 900 produces a liquids stream 906 and a solids stream 908. The liquids stream 906 may include starch that has been separated from the fiber by the first mechanical separation device 904. However, the solids stream 908 may still contain starch and/or the food grade protein. Thus, the process 900 may wash the fiber through a series of mechanical separation devices.

The process 900 directs the liquids stream 906 to a liquefaction tank 801 and sends the solids stream 908 to a first tank 910. The first tank 910 receives another liquids stream 920 of clean water. Here, the combined streams are mixed and heated to about 76° C. to about 85° C. (170° F. to about 185° F., about 349 K to about 358 K) for about 1 to about 60 minutes. In an embodiment, the combined streams are mixed and heated to about 82° C. (about 180° F., about 355 K) for about 5 minutes. The process 900 sends this combined stream from the first tank 910 to a second mechanical separation device 912, which can be similar or identical to the mechanical separation apparatus 100 described above or can be a different mechanical separation device entirely.

The second mechanical separation device 912 separates fiber from the liquid medium, which includes additional starch that has been washed from the fiber, producing another liquids stream 914 to be sent to a water makeup process, which makes the process stream 902 (as shown by the dotted line), or alternatively, to liquefaction tank 801, to makeup water for slurry tank. The second mechanical separation device also provides another solids stream 916 that is sent to the second tank 918. The process 900 sends the combined stream from the first tank 910 through the second mechanical separation device 912, which separates components such as the solid particles from the smaller particles and liquids stream a second time, also referred to as a second pass. The second tank 918 may contain about 40% solids content (average).

The screen designs and/or the flinger designs may be incorporated in mechanical separation device(s), such as multi-zoned screening apparatus or paddle screen to be used in processes as described in U.S. patent application Ser. No. 14/073,046, entitled "Advanced Cook Technology," filed on Nov. 6, 2013; U.S. patent application Ser. No. 14/028,020, entitled "Hybrid Separation," filed on Sep. 16, 2013, now issued as U.S. Pat. No. 9,376,504; U.S. patent application Ser. No. 15/187,563, entitled "Hybrid Separation", filed on Jun. 20, 2016, and in U.S. patent application Ser. No. 14/557,175, entitled "Optimized Dewatering Process for an Agricultural Production Facility," filed on Dec. 1, 2014; the contents of which are hereby incorporated by references in their entireties.

Those of ordinary skill in the art will recognize how to modify or configure the apparatus 100 so as to effectively operate in these other industries. Thus, the various features of the invention may be used alone or in numerous combinations depending on the needs and preferences of the user.

CLAIM RELATED EXAMPLES

In Example 1, a rotary tool for a mechanical separator, the tool can optionally comprise: a center shaft having a longitudinal axis; a plurality of longitudinal paddles coupled to the shaft, at least one paddle of the plurality of paddles having an inner edge and aligned radially relative to the longitudinal axis, wherein the at least one paddle has an elongate extent along the longitudinal axis with opposing lateral sides along the elongate extent; and a flange having a triangular shape in a radial cross-section, the flange affixed to the inner edge of the at least one paddle and having an apex radially inward of the at least one paddle.

In Example 2, the rotary tool of Example 1, wherein the flange can be optionally shaped as a wedge bar with a longitudinal extent and has two tapered faces extending from the apex, each of the two tapered faces positioned on a respective one of the opposing lateral sides of the at least one paddle.

In Example 3, the rotary tool of Example 2, wherein the wedge bar can optionally be symmetrically shaped and positioned with respect to the at least one paddle having the apex aligned radially inward of the inner edge and the two tapered faces of equal extent.

In Example 4, the rotary tool of any one or combination of Examples 1-3, wherein the flange can optionally have one or more gaps therein spaced along a longitudinal extent, each of the one or more gaps configured to accommodate a device that couples the at least one paddle to the shaft.

In Example 5, the rotary tool of any one or combination of Examples 1-4, further optionally comprising a plurality of flingers coupled to an outer edge of the at least one paddle, wherein the plurality of flingers each extend tangentially outward of at least one of the opposing lateral sides.

In Example 6, a rotary tool for a mechanical separator, the tool can optionally comprise: a center shaft having a longitudinal axis; a plurality of longitudinal paddles coupled to the shaft, at least one of the plurality of paddles having an outer edge and aligned radially relative to the longitudinal axis, wherein the at least one paddle has an elongate extent along the longitudinal axis with opposing lateral sides along the elongate extent; and a plurality of flingers coupled to the at least one paddle at the outer edge, each of the plurality of flingers extending from the paddle to be positioned radially and tangentially outward of both opposing lateral sides of the paddle.

In Example 7, the rotary tool of Example 6, wherein each the plurality of flingers optionally is symmetrically shaped and is symmetric arranged with respect to the outer edge of the at least one paddle.

In Example 8, the rotary tool of Example 7, wherein each of the plurality of flingers optionally has a first edge and a second edge are arranged in a chevron shape and meeting one another at an apex aligned with the outer edge of the at least one paddle.

In Example 9, the rotary tool of Example 8, wherein the apex optionally is an axially forward-most point of each of the plurality of flingers along the longitudinal axis.

In Example 10, the rotary tool of Example 8, wherein each of the plurality of flingers optionally has an inner radial side and an opposing outer radial side, and wherein the outer radial side is tapered at least axially and radially with respect to the longitudinal axis with each of the plurality of flingers being thickest at the apex and progressively thinner along the first edge and the second edge away from the apex.

In Example 11, the rotary tool of Example 10, wherein the inner radial side is optionally received in and is coupled to the paddle at a notch in the outer edge of the paddle.

In Example 12, the rotary tool of any one or combination of Examples 6-11, wherein each of the plurality of flingers optionally have a triangular or truncated triangular shape when viewed in both an axial cross-section and a radial cross-section.

In Example 13, the rotary tool of any one or combination of Examples 6-12, wherein the plurality of flingers are optionally positioned along less than an entire longitudinal length of the shaft and the at least one paddle.

In Example 14, the rotary tool of any one or combination of Examples 6-13, further optionally comprising a flange having a triangular shape in a radial cross-section, the flange affixed to the inner edge of the at least one paddle, the flange having an apex radially inward of the at least one paddle.

In Example 15, the rotary tool of Example 14, wherein the flange optionally is shaped as a wedge bar with a longitudinal extent and has two tapered faces extending from the apex, each of the two tapered faces positioned on a respective one of the opposing lateral sides of the at least one paddle.

In Example 16, a mechanical separation device can optionally comprise: a housing with a feed inlet at a first end section of the housing and a discharge outlet at a second end section of the housing, the feed inlet configured to receive a slurry comprising solids within a liquid medium; a screen positioned within the housing to separate at least a portion of the liquid medium from the solids; a rotary assembly within the housing, the rotary assembly configured to move the solids and the liquid medium along an axial length of the housing toward the discharge outlet; a sensor configured to sense a moisture content of the solids at the discharge outlet; a controller in communication with the sensor and configured to determine a desired elevation level of the second end section relative to the first end section based upon the moisture content; and a raising mechanism, in response to a control signal from the controller, configured to raise or lower the second end section relative to the first end section to alter a residence time of the slurry within the mechanical separation device without altering a rotational speed or configuration of the rotary assembly.

In Example 17, the mechanical separation device of Example 16, wherein the raising mechanism optionally comprises a telescoping mechanism having an upper leg portion that fits inside a lower foot portion, wherein the upper leg portion and lower foot portion are connected by a flange.

In Example 18, the mechanical separation device of any one or combination of Examples 16-17, wherein the rotary assembly optionally comprises: a center shaft having a longitudinal axis; a plurality of longitudinal paddles coupled to the shaft, at least one of the plurality of paddles having an outer edge and aligned radially relative to the longitudinal axis, wherein the at least one paddle has an elongate extent along the longitudinal axis with opposing lateral sides along the elongate extent; and a plurality of flingers coupled to the at least one paddle at the outer edge, each of the plurality of flingers extending from the paddle to be positioned radially and tangentially outward of both opposing lateral sides of the paddle.

In Example 19, the mechanical separation device of Example 18, wherein each of the plurality of flingers optionally have a triangular or truncated triangular shape when viewed in both an axial cross-section and a radial cross-section.

In Example 20, the mechanical separation device any one or combination of Examples 16-19, wherein the rotary assembly optionally comprises: a center shaft having a longitudinal axis; a plurality of longitudinal paddles coupled to the shaft, at least one paddle of the plurality of paddles having an inner edge and aligned radially relative to the longitudinal axis, wherein the at least one paddle has an elongate extent along the longitudinal axis with opposing lateral sides along the elongate extent; and a flange having a triangular shape in a radial cross-section, the flange affixed to the inner edge of the at least one paddle, the flange having an apex radially inward of the at least one paddle.

What is claimed is:

1. A rotary tool comprising:
a center shaft having a longitudinal axis;
a plurality of longitudinal paddles coupled to the shaft, at least one paddle of the plurality of paddles having an inner edge and aligned radially relative to the longitudinal axis, wherein the at least one paddle has an elongate extent along the longitudinal axis with opposing lateral sides along the elongate extent; and
a flange having a triangular shape in a radial cross-section, the flange directly affixed to the inner edge of the at least one paddle and extending from the inner edge of the at least one paddle to an apex radially inward of the at least one paddle, wherein the flange is shaped as a wedge bar with a longitudinal extent and has two tapered faces extending from the apex, each of the two tapered faces positioned on a respective one of the opposing lateral sides of the at least one paddle.

2. The rotary tool of claim 1, wherein the wedge bar is symmetrically shaped and positioned with respect to the at least one paddle having the apex aligned radially inward of the inner edge and the two tapered faces of equal extent.

3. The rotary tool of claim 1, wherein the flange has one or more gaps therein spaced along the longitudinal extent, each of the one or more gaps configured to accommodate a device that couples the at least one paddle to the shaft.

4. The rotary tool of claim 1, further comprising a plurality of flingers coupled to an outer edge of the at least one paddle, wherein the plurality of flingers each extend tangentially outward of at least one of the opposing lateral sides.

5. A rotary tool comprising:
a center shaft having a longitudinal axis;
a plurality of longitudinal paddles coupled to the shaft, at least one of the plurality of paddles having an outer edge and aligned radially relative to the longitudinal axis, wherein the at least one paddle has an elongate extent along the longitudinal axis with opposing lateral sides along the elongate extent; and
a plurality of flingers coupled to the at least one paddle at the outer edge, each of the plurality of flingers extending from the at least one paddle to be positioned radially and tangentially outward of both the opposing lateral sides of the at least one paddle, wherein each of the plurality of flingers is symmetrically shaped and is symmetrically arranged with respect to the outer edge of the at least one paddle.

6. The rotary tool of claim 5, wherein each of the plurality of flingers has a first edge and a second edge, are arranged in a chevron shape and meet one another at an apex aligned with the outer edge of the at least one paddle.

7. The rotary tool of claim 6, wherein the apex is an axially forward-most point of each of the plurality of flingers along the longitudinal axis.

8. The rotary tool of claim 6, wherein each of the plurality of flingers has an inner radial side and an opposing outer radial side, and wherein the outer radial side is tapered at least axially and radially with respect to the longitudinal axis with each of the plurality of flingers being thickest at the apex and progressively thinner along the first edge and the second edge away from the apex.

9. The rotary tool of claim 8, wherein the inner radial side is received in and is coupled to the at least one paddle at a notch in the outer edge of the at least one paddle.

10. The rotary tool of claim 5, wherein each of the plurality of flingers have a triangular or truncated triangular shape when viewed in both an axial cross-section and a radial cross-section.

11. The rotary tool of claim 5, wherein the plurality of flingers are positioned along less than an entire longitudinal length of the shaft and the at least one paddle.

12. The rotary tool of claim 5, further comprising a flange having a triangular shape in a radial cross-section, the flange affixed to the inner edge of the at least one paddle, the flange having an apex radially inward of the at least one paddle.

13. The rotary tool of claim 12, wherein the flange is shaped as a wedge bar with a longitudinal extent and has two tapered faces extending from the apex, each of the two tapered faces positioned on a respective one of the opposing lateral sides of the at least one paddle.

14. A rotary tool comprising:
a center shaft having a longitudinal axis;
a plurality of longitudinal paddles coupled to the shaft, at least one paddle of the plurality of paddles having an inner edge and an outer edge, wherein the inner edge and the outer edge are aligned radially relative to the longitudinal axis, wherein the at least one paddle has an elongate extent along the longitudinal axis with opposing lateral sides along the elongate extent;
a plurality of flingers coupled to the at least one paddle; and
a flange having a triangular shape in a radial cross-section, the flange affixed to the at least one paddle, wherein the flange is shaped as a wedge bar with a longitudinal extent and has two tapered faces extending from an apex, each of the two tapered faces positioned on a respective one of the opposing lateral sides of the at least one paddle.

15. The rotary tool of claim 14, wherein the plurality of flingers are coupled to the at least one paddle at the outer edge.

16. The rotary tool of claim 14, wherein the flange is affixed to the inner edge of the at least one paddle.

* * * * *

UNITED STATES PATENT AND TRADEMARK OFFICE
CERTIFICATE OF CORRECTION

| | |
|---|---|
| PATENT NO. | : 12,134,049 B2 |
| APPLICATION NO. | : 16/434659 |
| DATED | : November 5, 2024 |
| INVENTOR(S) | : Gallop et al. |

It is certified that error appears in the above-identified patent and that said Letters Patent is hereby corrected as shown below:

On the Title Page

Page 2, in Column 2, under "Other Publications", Line 32, delete "malled" and insert --mailed-- therefor In the Specification In Column 10, Line 32, delete "900" and insert --90°-- therefor In Column 10, Line 38, delete "1800" and insert --180°-- therefor In Column 10, Line 41, delete "1800" and insert --180°-- therefor In Column 11, Line 9, delete "104" and insert --102-- therefor In Column 11, Line 54, delete "140" and insert --134B-- therefor In Column 12, Line 64, delete "140)" and insert --100)-- therefor In Column 13, Line 42, delete "154" and insert --156-- therefor In Column 14, Line 17, delete "130" and insert --128-- therefor In Column 15, Line 53, delete "feed" and insert --inlet-- therefor In Column 17, Line 13, delete "900" and insert --90°-- therefor In Column 17, Line 30, delete "150A and 150B" and insert --140A and 140B-- therefor Signed and Sealed this
Twentieth Day of January, 2026

John A. Squires
*Director of the United States Patent and Trademark Office*

CERTIFICATE OF CORRECTION (continued)
U.S. Pat. No. 12,134,049 B2

In Column 19, Line 12, delete "140" and insert --140B-- therefor

In Column 19, Line 16, delete "144B." and insert --140B.-- therefor

In Column 21, Line 13, delete "100" and insert --110-- therefor

In Column 21, Line 38, delete "(50" and insert --(5°-- therefor

In Column 21, Line 40, delete "(20" and insert --(2°-- therefor

In Column 21, Line 41, delete "(20" and insert --(2°-- therefor

In Column 21, Line 44, delete "(50" and insert --(5°-- therefor

In Column 25, Line 30, delete "901." and insert --801.-- therefor